Dec. 31, 1935.    L. M. DIETERICH    2,025,731
PHOTOGRAPHIC APPARATUS
Filed Sept. 21, 1933    6 Sheets-Sheet 1

INVENTOR
Ludwig M. Dieterich
BY
Blair, Curtis & Dunne
ATTORNEYS

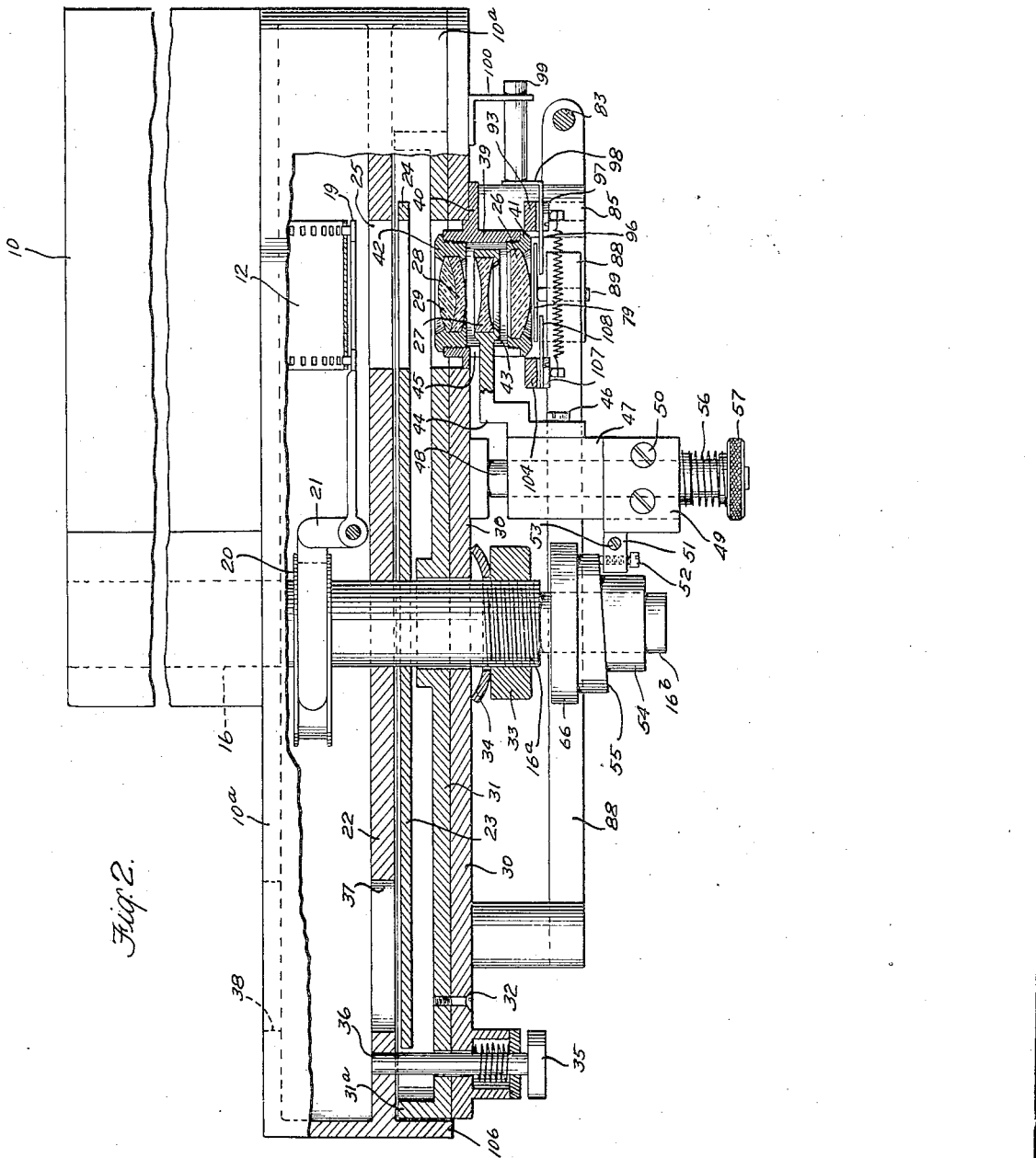

Dec. 31, 1935.   L. M. DIETERICH   2,025,731
PHOTOGRAPHIC APPARATUS
Filed Sept. 21, 1933   6 Sheets-Sheet 3
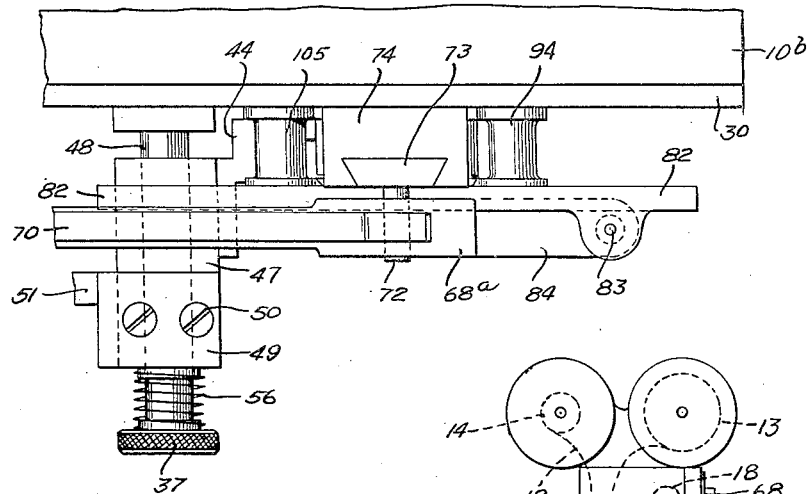
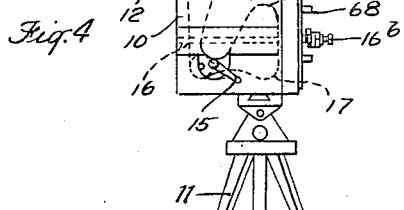
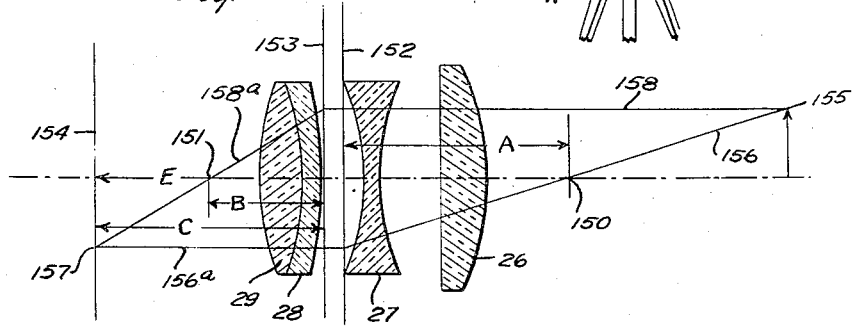
INVENTOR
Ludwig M. Dieterich
BY
Blair, Curtis & Dunne
ATTORNEYS Dec. 31, 1935.　　　　L. M. DIETERICH　　　　2,025,731
PHOTOGRAPHIC APPARATUS
Filed Sept. 21, 1933　　　6 Sheets-Sheet 4

INVENTOR
Ludwig M. Dieterich
BY
Blair, Curtis + Dunne
ATTORNEYS

Dec. 31, 1935.  L. M. DIETERICH  2,025,731
PHOTOGRAPHIC APPARATUS
Filed Sept. 21, 1933   6 Sheets-Sheet 5
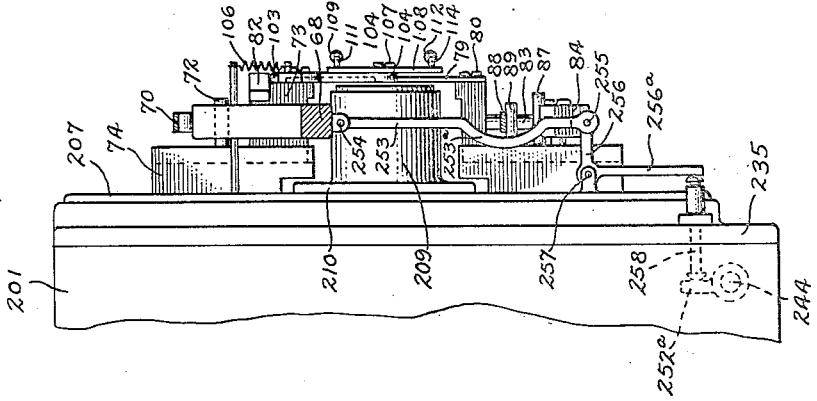
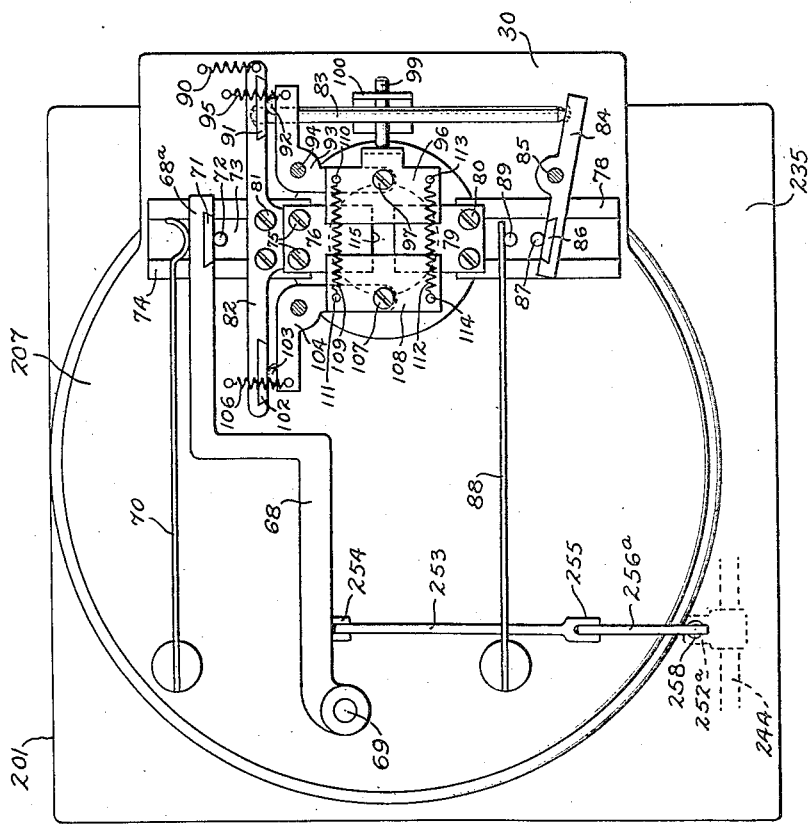
INVENTOR
Ludwig M. Dieterich
BY
Blair, Curtis & Dunne
ATTORNEYS Dec. 31, 1935.  L. M. DIETERICH  2,025,731
PHOTOGRAPHIC APPARATUS
Filed Sept. 21, 1933  6 Sheets-Sheet 6

| -Lens- | -Radii- | -Thickness- |
|---|---|---|
| L226 | $r_a = 16.0$ mm. <br> $r_b = 41.0$ mm. | $T_{a-b} = 3.5$ mm. |
| L227 | $r_c = 23.0$ mm. <br> $r_d = 16.0$ mm. | $T_{c-a} = 0.6$ mm. <br> $S_{b-e} = 5.25$ mm. |
| L228 | $r_e = 11.5$ mm. <br> $r_f = 13.0$ mm. | $T_{e-f} = 1.0$ mm |
| L229 | $r_g = 64.0$ mm. <br> $r_h = 17.5$ mm. | $T_{g-h} = 2.1$ mm <br> $S_{f-g} = 0.03$ mm |

INVENTOR
Ludwig M. Dieterich
BY
Blair, Curtis & Dunne
ATTORNEYS

Patented Dec. 31, 1935

2,025,731

UNITED STATES PATENT OFFICE 2,025,731

PHOTOGRAPHIC APPARATUS

Ludwig M. Dieterich, Los Angeles, Calif., assignor to The Dieterich Corporation, New York, N. Y., a corporation of New York Application September 21, 1933, Serial No. 690,349

34 Claims. (Cl. 88—16.6)

This invention relates to photographic apparatus and more particularly to apparatus for producing photographic pictures having relief or depth.

This application is a continuation in part of my application Serial No. 217,127, filed September 2, 1927.

One of the objects of the invention is to provide a thoroughly practical apparatus for producing photographic pictures having relief or depth. Another object is to provide an apparatus by means of which there is produced upon a photographic film, plate or the like, an image in which the objects photographed stand out clearly in relief. Another object is to provide an apparatus of the above nature capable of taking a picture in which the images of all the objects stand out with clearness irrespective of the distances of the objects from the apparatus when the picture is taken.

Another object is to provide a photographic apparatus capable of producing a so-called "negative" plate or film or the like having in itself relief or depth so that in a "positive" made therefrom the images of the objects will stand out clearly in relief.

Another object is to provide a thoroughly practical apparatus for motion picture photography and which produces pictures having relief or depth. Another object is to provide a motion picture camera for taking a succession of pictures in rapid sequence on a strip of film or the like and which dependably produces relief or depth in each picture. Another object is to provide an apparatus of the above nature which employs the usual motion picture film. Another object is to provide a motion picture camera of the above nature wherein the resulting negatives are developed and the positives are made therefrom in the usual manner and in readiness to be projected, without special apparatus.

Another object is to provide a motion picture camera which overcomes many well-known difficulties ordinarily encountered in motion picture photography and which produces pictures which, when projected, are free from certain heretofore unavoidable and highly objectionable defects.

Another object is to provide apparatus of the above general nature which is thoroughly dependable. Another object is to provide apparatus of the above general nature which is compact in construction and simple to operate. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings in which are shown several illustrative embodiments of the various possible embodiments of this invention;

Figure 2 is a horizontal section taken substantially as indicated by the section line 2—2 of Fig. 1, the camera box being broken away;

Figure 3 is a view from the upper edge of Fig. 2, showing a portion only of the mechanism seen in Fig. 2;

Figure 4 is a somewhat diagrammatic view on a small scale showing the motion picture camera in side elevation;

Figure 5 is a diagrammatic view for illustrating certain characteristics of a lens system;

Figure 9 is a central horizontal sectional view on an enlarged scale showing a preferred form of lens mounting and part of the preferred form of lens moving mechanism;

Figure 10 is an enlarged end elevation as seen from the right in Figure 6, showing the relation of the light-controlling mechanism of Figures 1 and 2 to the preferred form of lens construction and mounting;

Figure 11 is a detached fragmentary elevation as seen from the left of Figure 10 and shows more clearly certain of the operating mechanism for the light-controlling mechanism.

Similar reference characters refer to similar parts throughout the several views of the drawings.

Figure 1:
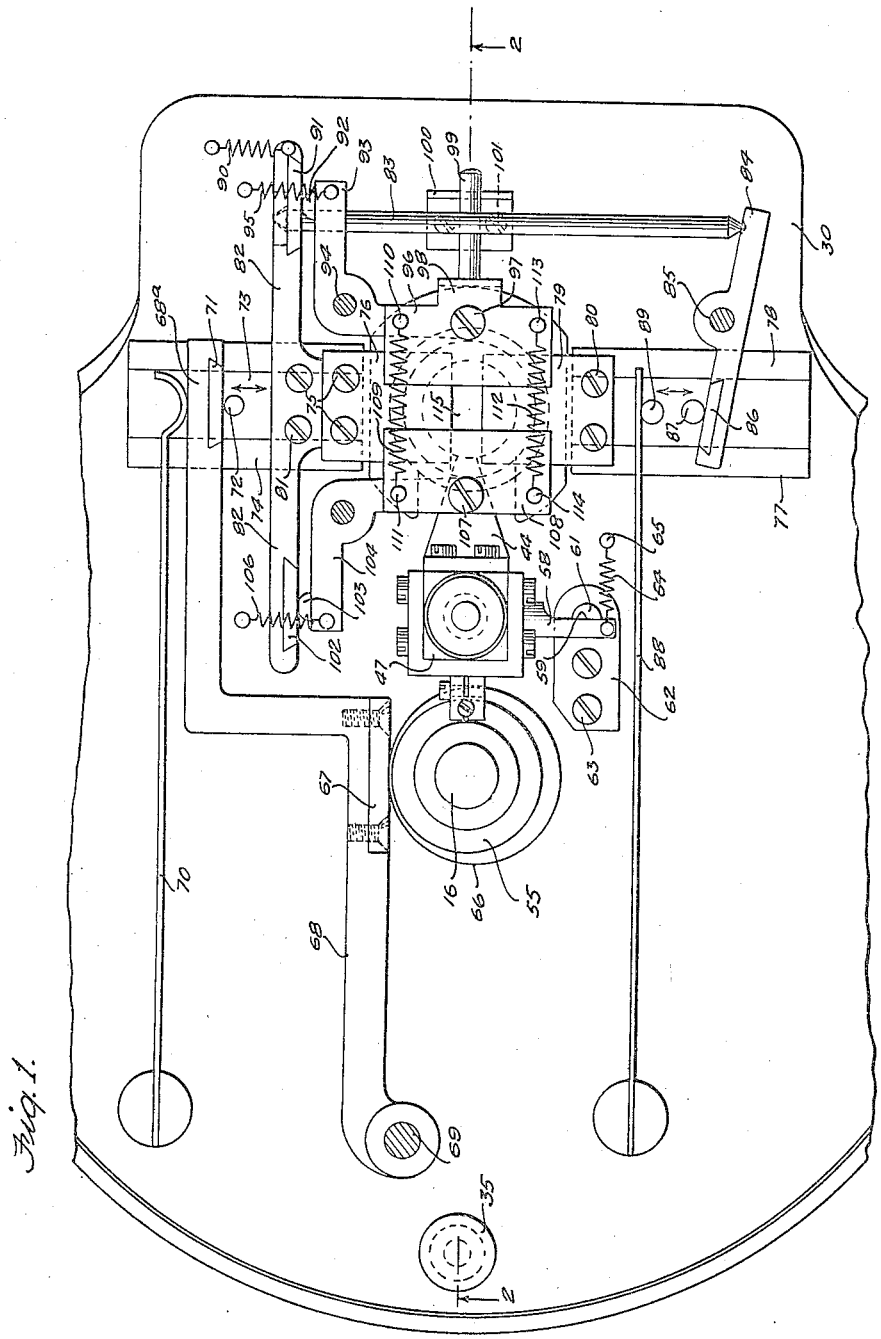
Figure 1 is a front elevation of a portion of a motion picture camera.

As conducive to a clearer understanding of the features of my invention, it may be pointed out that in taking a picture, as the art of photography is ordinarily practiced, the camera has to be "focussed" upon the objects which it is desired shall stand out most clearly and distinctly in the ultimate picture or photograph, and that in thus focussing the camera, the camera is adjusted upon or with respect to the particular plane in which the objects to be photographed most nearly lie. All of the objects or portions thereof which may be considered to be in this plane upon which the lens system of the camera has been focussed will, in the resultant film or plate, or in the resultant photograph or print, be relatively clear and distinct, while objects or other portions of objects which lie in front or in back of this plane or which are nearer to or farther from the camera, will be relatively indistinct or blurred, or, as is commonly said, out of focus. The greater the departure of the objects from coincidence with the plane upon which the camera has been focussed, the greater will be the blur. I term the above-mentioned plane upon which the lens system of the camera is focussed the "plane of sharpness" because, as will be clear from the above, the objects which are in substantial coincidence with this plane are reproduced, in the image formed by the lens system, with greater sharpness and clarity than are objects positioned on either side of this plane.

It may be noted also that, in any film that has been exposed in an ordinary camera and developed, or in any positive or print made therefrom, the images of the objects photographed appear as of a relative size which depends upon various factors such as, for example, the characteristics of the lens system of the camera, the size of the objects, distances of the objects from the camera, and other factors. Also, a change in the focus of a camera changes the sizes of the images of the objects. To make this more clear, let it be assumed by way of illustration that a camera is focussed upon a given plane and that an exposure is made. Images of the objects in that plane will be relatively sharply and clearly produced on the sensitized element of the camera, while images of other objects in the scene will be relatively obscure. If, now, such adjustments are made as will simply change the focus of the camera in the usual manner, to focus the camera upon a new plane of sharpness either nearer to or farther away from the camera, and, without moving the camera, a second exposure of the already exposed sensitized element be made, the images of the objects produced by this second exposure will be of a different size from those produced by the first exposure; the objects which are in the new plane of sharpness, and whose images should appear relatively sharp and clear in the second exposure, appear in images on the sensitized camera element of a different size from the size of the images of the same objects obtained by the first exposure. Thus, greater blurring than ever would be produced by reason of the fact that changing of the focus brought about a change of size in the images of all of the objects, successive exposures of the same sensitized camera element, with the camera successively focussed on different planes of sharpness resulting in the superimposition of differently dimensioned images of the objects.

I have discovered that, by moving the lenses of a lens system in a certain manner relative to each other and/or relative to the sensitized camera element, as I have more fully described in my application Serial No. 216,357, filed August 30, 1927, now Patent No. 1,927,925, I am able to produce upon the sensitized camera element, by a second or subsequent exposure thereof, but with respect to a different plane of sharpness than that of the first exposure, images of the same objects and which images will register in size with the corresponding images achieved by the first exposure; and by thus superimposing two such registering images I am able to produce a single photographic negative plate or film in which the images have the characteristics as to clearness or sharpness that follow from the utilization of two different planes of sharpness, it being clear that thus a substantially equal sharpness and distinctness in the picture are achieved for such objects as are positioned in these two planes and hence at two different distances from the camera. Thus, in the resulting negative or in a positive or print made therefrom, depth is achieved in that objects at two different distances from the camera are reproduced in the picture with substantially equal distinctness and clarity.

I prefer, however, to superimpose upon the sensitized camera element a greater number than two registering images of the objects being photographed, in each image a different plane of sharpness in the scene being brought into effect; thus, if, for example, three registering images are thus superimposed, each being an image corresponding to a different plane of sharpness, depth or relief is achieved in that objects lying at three different distances from the camera will be brought out with substantially equal sharpness and clearness in their images upon the sensitized camera element. And so, if I now superimpose upon the sensitized camera element an infinite number of registering images taken with respect to an infinite number of different planes of sharpness in the scene, all objects regardless of their distances from the camera are reproduced in images upon the sensitized camera element with substantially equal clearness and sharpness. Any photographic positives or prints which I make from the sensitized camera element which, it should be noted, may be developed or otherwise treated in the usual way, will produce the visual depth or relief of the original or negative.

One of the dominant aims of the present invention is to provide an entirely practical photographic apparatus by means of which pictures having depth or relief may be achieved as has been briefly outlined in the foregoing, and in the drawings I have shown one of the various possible embodiments of such an apparatus. In the drawings there is shown a motion picture camera since my invention achieves particular advantages peculiar to motion pictures, but it is to be understood that the invention in its broader aspects is equally applicable to taking so-called "still" pictures, snapshots, time exposures, portrait work, and other classes of photography.

Referring now to the drawings, and first briefly to Figure 4 thereof, there is shown on a small scale and somewhat diagrammatically a motion picture camera. There is shown a camera casing 10 mounted, for example, upon a suitable tripod 11. The film 12 is shown in dotted lines, passing from a reel 13, through the camera and being wound upon a reel 14. At the side of the camera box there is shown a crank 15 by means of which the camera is operated. Driven from this crank, among other mechanisms, is the mechanism for feeding the film and for operating the shutter, this latter mechanism including a longitudinally extending shutter shaft, shown in dotted lines at 16, which will be referred to more particularly hereinafter.

The mechanism for feeding the film is not shown in detail herein since it may take any of various well-known forms and, in and of itself, its construction is not important as relating to this invention. It may be noted, however, that, in the camera here diagrammatically illustrated, the film 12 passes through two loops indicated at 17 and 18 in Figure 4, and the exposures of the film are made as it passes between these two loops and is given an intermittent movement therebetween. The portion of the film approaching the loop 18 and the portion thereof leaving the loop 17 has a continuous movement, the loops supplying the necessary fullness to permit the intermittent movement of the portion between the loops. By means of a suitable shuttle mechanism, driven for example from the shaft 16, the portion of the film between the two loops 17 and 18 is given the intermittent movement; the film is held stationary for a predetermined interval of time with a "frame" thereof in position to be affected by the images formed by the lenses and during this interval the shutter (also driven by the shaft 16) is open to expose the film; the shutter then closes and the next "frame" of the film moves into operative position with respect to the lenses.

Referring now to Figure 2 of the drawings, there is shown the camera casing 10, broken away, and the shutter shaft 16 extending alongside the casing and projecting forwardly thereof. A portion of the film 12 is shown in operative position with respect to the lens system, the film portion passing through a shuttle mechanism indicated at 19. This shuttle mechanism operates as described above to intermittently move the film and may take the form of any of the various well-known mechanisms employed for this purpose. The shuttle mechanism is driven, for example, by a cam or the like indicated at 20 upon the shutter shaft 16 and connected to operate the shuttle mechanism through suitable connections indicated at 21.

At the front end of the camera casing is a projecting casing portion 10ª which is substantially circular in shape and projects outwardly to the left of the body of the camera casing, as viewed from the front. The casing portion 10ª has a front wall 22 through which the shutter shaft 16 projects and, mounted upon the shutter shaft just in advance of the wall 22 is the shutter 23. The shutter 23 takes the form of a circular plate mounted upon the shaft 16 to rotate therewith and having therein an arcuate slot 24 through which the light rays passing through the lens system are admitted to the film. The wall 22 has therein an opening 25 for the passage of the light rays to the film. As has been described in a brief way above, the rotating shutter 23 exposes the film during each stoppage thereof and shields the film during each intermittent movement thereof. It will be understood that the shutter 23 is shown herein in its simplest form and that it may be provided with various adjustments and may take various forms. The details of its construction are not important as relating to the features of this invention.

The lens system, as seen in Figure 2, comprises four lenses 26, 27, 28 and 29, and the entire lens system is mounted upon a front plate 30, as will be described more particularly hereinafter. This plate 30 rests against a plate 31 and is rigidly fastened thereto as by means of screws 32. The plate 31 is circular in shape and fits within a forwardly projecting annular flange 106 of the casing portion 10ª; it is rotatable about the shutter shaft 16, which passes therethrough, and it has about its periphery a rearwardly extending flange 31ª the edge of which bears against the outer surface of the wall 22. The portion 16ª of the shutter shaft is threaded and provided with a nut 33. Between the nut 33 and the face of the plate 30 is a light spring washer 34.

The plate 31, together with the plate 30 and the mechanisms carried thereby to be hereinafter described, is rotatable about the shaft 16. The spring washer 34 holds the plate 31 with its flange 31a firmly against the wall 22 while at the same time permitting the plate to be rotated manually. This rotatable mounting permits the lens system to be swung manually about the axis of the shutter shaft 16 and thereby moved into and out of operative position before the film opening 25. In the drawings, the lens system is in operative position ready for taking pictures upon the film 12. The plate 31 is held in this position by a spring pressed positioning plunger 35 which is mounted upon the plate 30 and takes into an opening 35 in the stationary wall 22. The plunger 35 may be withdrawn against the action of the spring and thereupon the plates 30 and 31 carrying the lenses may be rotated to move the lenses into any desired position about the axis of the shaft 16. For example, the plates may be swung until the lenses are positioned in front of an opening 37 which is provided in the wall 22 diametrically opposite the opening 25 therein. When the lenses are swung into such a position it is possible for the operator to look through a suitable opening indicated at 38 and view through the lenses themselves the scene which is to be photographed. A number of openings similar to the opening 36 are provided in the wall 22 for cooperating with the plunger 35 so as to locate the lenses in whatever positions may be desired about the axis of the shaft 16.

Still referring to Figure 2, the lenses of the lens system are seen to be contained within a cylinder or tube 39 which projects outwardly from the face of the plate 30. The tube is fastened to the plate by means of a suitable flange 40, and the rear end thereof projects into registering openings in the plates 30 and 31 which, in the operative position of the parts shown, are alined with the opening 25 in back of which is positioned the film. The front lens 26 is held in a bushing 41 which is threaded into the front end of the tube. The two rear lenses 28 and 29 are held in a bushing 42 which is threaded into the rear end of the tube. These three lenses are thus rigidly mounted and fixed in position relative to each other and relative to the operative portion of the film. The lens 27 is movable axially of the lens system relative to the other lenses and relative to the film. Preferably the lens 27 is held in a bracket 43 from which extends a radial arm 44 passing through a longitudinal slot 45 in the side of the tube 39 facing toward the shutter shaft 16. Thus, by means of the arm 44 the lens 27 may be moved back and forth axially of the lens system.

The movable lens 27, as is hereinafter amplified or explained in greater detail, is of special construction and has the characteristic, in its combination with or relation to the other lenses of the lens system, that movement thereof axially changes the focus but does not alter the size of the images of the objects formed by the lens system at the image plane or upon the sensitized camera element or film.

I have discovered that, with a lens system such as that illustrated in the drawings, and having the above-mentioned special construction and characteristics, all more in detail set forth hereinafter, by moving the lens corresponding to the lens 27 axially in the manner above described, I am enabled to change the focus of the lens system, and to bring into sharpness in the image formed by the lens system objects positioned in the scene at different distances from the lens system, and without changing the sizes of the images of the objects. For different axial positions of the lens 27 different planes at different distances from the camera are brought into sharpness in the image affecting the film 12 and, throughout, the sizes of the images of the various objects in the scene, affecting the film 12, remain substantially constant. Thus, by moving the lens 27 in an axial direction while the shutter 23 is open and a "frame" of the film 12 is thus exposed I accomplish, in effect, the superimposition of a number of images in which the corresponding objects register throughout, each image corresponding to a different plane of sharpness in the scene, and these images are thus combined to form a single image in which objects positioned at varying distances from the camera appear with substantially equal clearness and sharpness. The movement given to the lens 27 may be adjusted so as to bring into sharpness in the resulting image objects or portions of objects lying between any two desired planes in the scene. Preferably, for ordinary photography, I give the lens such a movement as will bring into effect, in the image, planes of sharpness extending from a plane near the camera to a plane at an infinite distance away. Regardless of the limits of the lens movement, all the planes (infinite in number), between the two limits of the plane nearest to the camera and the plane farthest away, are brought into sharpness in the image which effects the film. Thus, all of the objects and parts of objects which are photographed appear in the resulting image upon the film with substantially equal sharpness, and the depth or relief is achieved.

The lens 26 is the positive front lens and a plano-convex lens, the lens 27 is the negative lens and is a double concave lens, the lens 28 is a concavo-convex lens, and the lens 29 is a double convex lens; lenses 28 and 29 make up the corrective lens. This type of lens system is found to give excellent results, but it is to be understood that other types of lens systems may be employed to advantage.

Referring again to Figure 2 of the drawings, the arm 44 is rigidly fastened at its outer end, for example by means of screws 46, to a sleeve 47 which is slidably mounted upon a post 48. The post 48 is rigidly mounted upon the plate 30 and projects forwardly therefrom with its axis exactly parallel to the axis of the lens system. Secured to the sleeve 47 is a bracket 49 which is fastened thereto by means of screws 50, for example. Projecting from the bracket 49 toward the shutter shaft 16 is a split lug 51 in which is an adjustable screw 52, clamped by a clamping screw 53.

The shutter shaft 16 has a forward end portion 16b upon which is secured a cam 54 having a forwardly facing cam surface 55 which acts against the end of the screw 52. About the end of the post 48 is a coiled spring 56 which bears against the end of the sleeve 47 and is provided with an adjusting nut 57 threaded upon the end of the post. The spring 56 holds the screw 52 against the cam surface 55 and this cam surface thus determines the axial position of the lens 27. The cam 55, rotating with the shutter shaft 16, gives the lens 27 an axial movement in one direction and back again during each rotation of the shutter shaft. The cam is so designed that it will give the lens a movement such as will bring into sharpness in the image all the planes in the entire scene or all of such planes as pass through the objects which it is desired to reproduce sharply in the picture. The range of movement of the lens is adjustable by means of the adjusting screw 52 which is firmly locked in position by means of the locking screw 53, after adjustment.

Referring to Figure 1 of the drawings, projecting downwardly from the sleeve 47 is an arm 58 having a finished surface 59 which bears against the surface 60 of a post 61. The post 61 is formed upon a bracket 62 which is rigidly secured to the plate 30 as by means of screws 63. A spring 64, acting between the end of the arm 58 and a pin 65 projecting from the plate 30, holds the surface 60 against the surface 59. The coacting arm 58 and post 61 hold the sleeve 47 from turning about the post 48 and guide the sleeve 47 in its sliding movements. The surface 60 of the post 61 is parallel to the axis of the lens system and thus, as the lens 27 is given its axial movement, it is dependably held in accurate coaxial relation with the other lenses. A slight twisting or other movement of the lens 27 out of its proper axial position would interfere with the proper action of the lens system in producing a clear image.

The cam surface 55 thus gives the lens 27 an axial movement in one direction and back again to its original position with each rotation of the shutter shaft 16. As has been described above, during each rotation of the shutter shaft, the shutter is open to expose the film for a predetermined interval of time and is closed to shield the film during the remainder of its rotation and while the film is being moved by the shuttle mechanism to bring the next "frame" thereof into position to be affected by the images formed by the lens system. Preferably, the relation between the cam surface 55 and the shutter 23 upon the shutter shaft 16 is such that the lens 27 is given its movement in one direction while the film is exposed and is returned in the opposite direction while the shutter is closed. Thus, in each of the successive pictures impressed upon the strip of film 12, there is dependably produced depth or relief. As each picture is taken, the lens 27 is moved so as to successively bring into sharpness in the image affecting the film, objects lying in planes at varying distances away. Moreover, the sizes of the images of all the objects remain substantially constant and therefore all of the objects, regardless of their varying distances from the camera, are reproduced, in the image on the film, with sharpness and clarity and without blurring.

The cam 54, in addition to the cam surface 55, is provided with a peripheral cam surface 66. Referring to Figure 1, engaging the cam surface 66 is a hardened plate 67 forming part of a lever 68. The lever 68 is pivoted upon a stud 69 projecting outwardly from the plate 30, and is held against the cam surface 66 by means of a spring 70 bearing against the end portion 68a of the lever. In the end portion 68a of the lever 68 is a hardened plate 71 which bears against a pin 72 projecting from a slide 73. The slide 73, as shown in Figure 3, is supported in a block 74 secured to the face of the plate 30 above the lenses. Secured to the slide 73 by means of screws 75 is a flat blade-like member 76 which projects downwardly in front of the sleeve 39 in which the lenses are mounted. Beneath the lenses is a slide 77 similar to the slide 73 and mounted in a block 78 similar to the block 74. The slide 77 carries a blade 79 similar to the blade 76 and secured to the slide 77 by means of screws 80. The blades 76 and 79 are substantially alined and their ends project toward each other adjacent to the front end of the sleeve 39.

Secured to the slide 73 by means of screws 81 is a cross-arm 82. Bearing against the projecting right-hand portion of the arm 82, as viewed in Figure 1 of the drawings, is a strut 83, the other end of which bears against a lever 84. The lever 84 is pivoted upon a stud 85 projecting from the plate 30 and has a hardened insert 86 which bears against a pin 87 projecting from the slide 77. A spring 88 bears downwardly (as viewed in Figure 1) against a pin 89 on the slide 77 and thus tends to swing the lever 84 in a counter-clockwise direction so that the strut 83 is held in position between the lever 84 and the arm 82.

As the cam surface 66 rotates, the lever 68 rocks about its pivot 69, the right-hand end thereof (as viewed in Figure 1) moving up and down. This movement of the lever 68 imparts, through the connections just described, an up and down movement to the two slides 73 and 77, the slides moving toward each other and then away from each other to alternately decrease and enlarge the distance between the adjacent edges of the blades 76 and 79. In order to steady this movement and counteract any binding effect upon the slide 73, a spring 90 is provided acting upon the end portion of the arm 82 against the action of the spring 70.

In the right-hand end portion of the arm 82 is a hardened piece 91 which engages with a rounded projection 92 on a bell crank lever 93. The lever 93 is pivoted upon a pin 94 projecting from the plate 30, and a spring 95 holds the projection 92 against the surface 91. Upon the other arm of the bell crank 93 is a blade-like plate 96 loosely fastened thereon by means of a single screw 97. Projecting rearwardly from the blade 96 is a bracket 98 from which extends an arm 99. The arm 99 slidably enters an opening through a bracket 100 which is secured to the plate 30 by means of screws 101.

In the left-hand portion of the arm 82 (as viewed in Figure 1) is a hardened piece 102 similar to the piece 91. This hardened piece 102 is engaged by a rounded projection 103 on a bell crank lever 104. The lever 104 is pivoted upon a pin 105 projecting from the plate 30 and the projection 103 is held against the hardened part 102 by means of a spring 106. On the other arm of the bell crank 104 is loosely fastened, by means of a single screw 107, a blade-like plate 108 similar to the plate 96.

The plate 108 overlaps the two plates 76 and 79 and its inner edge faces the inner edge of the plate or blade 96, the two blades 108 and 96 being positioned in the same plane. Adjacent their upper edges the two plates 96 and 108 are connected by a spring 109 stretched between a pair of pins 110 and 111; adjacent their lower edges these two plates are connected by a spring 112 stretched between a pair of pins 113 and 114. The plates 96 and 108 are permitted to swivel about the respective screws 97 and 107, and the springs 109 and 112 are adapted to keep their adjacent edges always substantially parallel.

As seen in Figure 1, the four plates 76, 79, 96 and 108 form between their inner edges an opening 115 which is substantially in line with the axis of the lens system and positioned directly in front of the lens system. The light rays which pass through the lens system to affect the film are admitted thereto through this opening 115. Preferably, the opening between the plates or blades is rectangular in shape and therefore of substantially the same shape as the film surface which is exposed. As has been described above, as the shutter shaft 16 rotates, the up and down movement imparted to the lever 68 by the cam surface 66 causes the plates 76 and 79 to move toward and away from each other. As the slide 73 reciprocates, the arm 82, moving therewith, swings the two bell cranks 93 and 104 about their pivots, and the two plates 96 and 108 are moved toward and away from each other. All of the plates move inwardly together toward the axis of the lens system and all move outwardly together and thereby the size of the opening 115 is alternately decreased and increased as the shutter shaft 16 rotates. The parts are so proportioned that each of the four plates moves substantially the same distance for a given swing of the lever 68 and thus the rectangular shape of the opening 115 is continually preserved.

The size of the opening 115 determines the amount of light admitted to the film through the lens system. The cam surface 66 is so related to the cam surface 55 that, as the lens 27 is moved to bring into sharpness, in the image, planes at an increasing distance away, the plates 76, 79, 96 and 108 are moved to increase the size of the opening 115. Thus, as objects at varying distances from the camera are brought into sharpness in the image affecting the film, the amount of light admitted to the film is changed, the amount of light being increased for objects relatively far away and being decreased for objects relatively near. In this manner, the proper reproduction of the image upon the film throughout the range of movement of the moving lens 27 is dependably assured.

It will be seen that the mechanism above described is simple and compact and capable of highly efficient and accurate operation. The position of the movable lens 27 in proper coaxial relation to the lens system is dependably maintained so that proper functioning of the lens system throughout is assured. Also, the mechanism provides for convenient adjustment of the range of movement of the moving lens to meet varying conditions of practical operation. The mechanism shown and described is capable of operating efficiently and dependably at any speed corresponding to which it may be desired to operate the motion picture camera. The films after exposure have impressed thereon images which have natural and visual depth. The negative films may be developed or otherwise treated in the usual manner and, when positives or prints are made from the films in the usual manner, these positives have the depth or relief of the original or negative. When my invention is utilized in a motion picture camera, as described herein, the positives made from the original or negative strip of film are projected in the usual motion picture projection machine and the projected pictures have the depth and relief which was impressed upon the original film when the pictures were taken.

It has been mentioned above that my invention achieves particular advantages in the field of motion picture photography. In present day motion picture photography, when an object is in motion in the field of the camera, and particularly when the motion of the object is transversely of or across the field of the camera while the camera is focussed in the usual manner upon the moving object, the motion that takes place during exposure of a single "frame" of the film produces upon the "frame" a series of relatively displaced superimposed and non-registering images of the moving object, all of the images standing out with almost the same degree of sharpness because of the fact that the image is moving in the plane of sharpness, and thus causing great blurring and indistinctness. This defect is most pronounced when the object moves across the field of the camera and relatively close to the camera. When my invention is employed this blurring and indistinctness is completely eliminated, since the moving object is photographed sharply and distinctly only at the one instant when the object is brought into sharpness in the image by the moving lens; any prior or subsequent displacement of the moving object in the field of the camera finds the lens system of the camera focussed not upon the moving object (as is the case with the present day methods) but focussed upon a plane of sharpness moving progressively away from the moving object. Accordingly, the displaced positions of the moving object, if reproduced at all upon the film, are impressed upon the latter with an increasing lack of clarity and sharpness. I thus eliminate the blurring effect of so-called "cross motion", an effect heretofore considered unavoidable and one of the most serious defects in the art of motion picture photography as the latter is now practiced.

In the endeavor to make clear my present understanding of the theory involved in my invention, it will be helpful to consider certain known characteristics, as they are now understood by those skilled in the art of photography, of a representative camera lens system. Referring to Figure 5 of the drawings, I have shown the four lenses 26, 27, 28 and 29. In this particular lens system, the first lens group consisting of the lenses 26 and 27 is constituted of the lenses which produce the image and which may be called the imaging lenses, and the second lens group consisting of the lenses 28 and 29 is constituted of lenses which correct certain errors and which may be called corrective lenses. The lens system may have any suitable number of lens groups. In accordance with the understanding of those skilled in the art of photography, it is assumed that such an illustrative lens system has what is called a "first principal focal point", which is indicated in the drawings at 150, and a "second principal focal point", which is indicated at 151; it is also assumed that the lens system has what is called a "first principal plane" and what is called a "second principal plane". These two planes are indicated at 152 and 153 respectively. The "image plane", or the plane at which the sensitized camera element, such as the plate or film, is positioned, known also as the "conjugate focal plane", is indicated at 154.

In order to make these characteristics of these lens systems a little more clear, their relation with respect to a point or object, within the range of the camera, may be considered. Thus, at 155 I have shown a single point from which light rays pass through the lens system to affect the sensitized camera element positioned in the plane 154. A light ray, emanating from the point 155, is indicated at 156; it passes through the first principal focal point 150 and, upon reaching the first principal plane 152 it has its direction changed as indicated by the line 156ª, striking the image plane 154 at 157. Another light ray 158 passes directly through the lenses, in a path parallel to the center line of the lens system, to the second principal plane 153 from which, with its direction changed as indicated by the line 158ª, it passes through the second principal focal point 151 and strikes the image plane 154 at the same point 157 at which the light ray 11 strikes the image plane and at which point an image of the object (the point 155) is formed.

The distance A between the first principal focal point 150 and the first principal plane 152 is called the "first equivalent focal length"; the distance B between the second principal focal point 151 and the second principal plane 153 is called the "second equivalent focal length". The distance C between the second principal plane and the image plane is called the "second conjugate focal length". The distance E between the rearmost point of the rearmost lens 29 of the system and the image plane 154 is called the "back focal length".

Still referring to the art of photography as it is practiced in present day methods, when a camera is focussed upon an object, or more correctly upon a plane, the lenses of the lens system, in certain fixed positions relative to one another, are in a certain position relative to the sensitized camera element, and the focal lengths mentioned above have certain values. If, as has been explained hereinbefore, the position of the lens system is now adjusted in known manner, that is by appropriate adjustment in an axial direction of the lens system as a unit relative to the image plane 154, so as simply to change the focus of the camera, the images of objects in the scene produced at the image plane 154 change in size. Such adjustments, to change the focus of a lens system in known manner, effect certain changes in the focal values discussed above, which it is not necessary to discuss in detail herein.

As for the theory of my invention, briefly considered, as I now understand the theory of what takes place when I make such adjustments that different planes in the scene are brought into sharpness in the image, all without changing the sizes of the images of the objects in the scene, I am effecting among other things a change in the second equivalent focal length B without changing the position of the second principal plane 153 relative to the image plane 154.

In this connection, it might, however, be of aid to point out that, when the entire lens system in a camera is shifted, according to known methods, the resultant change in focus is accompanied by change in size of the image. Such shifting of the lens system as a whole results in shifting the principal planes of the lens system and also the principal foci, resulting in out-of-focus images that are made up of circles of confusion which are eccentric to the in-focus point images that make up an in-focus image. This eccentricity means not only change in size but also non-registry of out-of-focus and in-focus images if impressed upon the same film or plate. Now, it has been proposed, but for different purposes, to make movable and to shift one component lens of a lens system in a camera, and here again, change in focus results and is again accompanied by change in size of image, the out-of-focus images being again made up of circles of confusion which are eccentric to the in-focus point images that make up an in-focus image of an object or scene; here, also, a shifting of principal planes and of the principal foci takes place and the results are substantially similar to those just mentioned in the case of shifting of the entire lens system.

In contrast, however, to such known phenomena or such known apparatus, the lens group of my invention embodies lens components, one of which (the negative lens) is movable relative to the other and is moved during exposure, which, by the use of known methods of correction and computation, are corrected to avoid shifting of principal planes though the focus is changed, thus achieving change in focus during the exposure without, however, changing the size of in-focus and out-of-focus images of the scene or object to which the film plate or sensitized photographic element is thus exposed through the lens group; in further contrast to such known phenomena or apparatus as I have mentioned immediately above, the avoidance of a shift in the principal planes while changing the focus results in out-of-focus images of points in the scene or object that are made up of circles of confusion which are concentric (not eccentric) with the in-focus images of the same respective points. For each one of the infinite number of planes of sharpness throughout the depth of the scene and hence for each corresponding focal length, there is impressed upon the sensitized element an in-focus image with respect to which all other and hence out-of-focus images of the same scene are made up of circles of confusion which are concentric with the corresponding and respective points of the in-focus image. This concentricity means constancy of size of the multitude of in-focus and out-of-focus images as well as registry thereof on the sensitized camera element. The correction of the lenses of the lens group to achieve in coaction such concentricity may be effected by any known graphic or computing methods.

I have above pointed out, with reference to Figure 5, that shifting of the movable lens 27 along the optical axis changes the focal length B without, however, causing a change in the position of the second principal plane 153 relative to the stationary lenses 26, 28 and 29 and relative to the film plane 154 and that, due to these considerations, the sizes of successive images are identically the same although each image corresponds to a different plane of sharpness. The principal plane, therefore, remains fixed and the principal focal point shifts; the lenses, in construction, are therefore correspondingly corrected, using any known method of lens computation. When so corrected, therefore, the light rays, in passing through the lens system during movement of the movable lens, are bent or controlled and strike the image plane in pencils that give circles of confusion for the out-of-focus images that are concentric with the in-focus point images that make up an in-focus image of the scene or object. Due to this concentricity, constancy of size of in-focus and out-of-focus images results.

Figure 12:
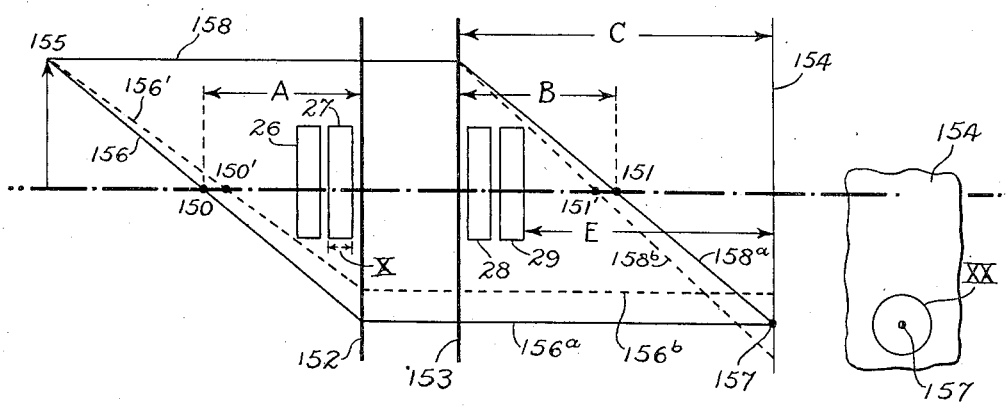
Figure 12 is a diagrammatic and graphic representation of certain actions that take place in the lens system embodying the preferred forms of my invention.

Now making reference to Figure 12, all of Figure 5 is reproduced (the lenses, however, being shown diagrammatically), thus to show the point image 157 of the object point 155, exactly as it is achieved in Figure 1 by a consideration of the four cardinal factors of the lens system; however, let it now be considered that the lens 27 is shifted to the right. The focal length B is, in accordance with the optical prescription above stated, permitted to change but without changing the position of the principal plane 153 relative to the lenses 26, 28 and 29 and relative to the film plane 154. The second principal focal point 151 is thus moved to the position 151', being moved toward the optical center of the lens system and a commensurate shifting toward the optical center of the first principal focal point 150 takes place, namely to the position 150'. No shifting in the principal planes takes place. Light ray 158, after this shift in the lens 27, strikes the principal plane 153 and is bent as at 158ª, passing through the new focal point 151'. The first principal focal point having, however, moved from the point 150 to the point 150', a light ray 156' from the point object 155 passes through the focal point 150', strikes the principal plane 152 and is bent as at 156ᵇ to pass parallel to the optical axis. Similar rays, intersecting as shown by the broken lines, produce a circle of confusion XX whose center is spaced from the optical axis by exactly the same distance as the spacing of the point image 157 from the optical axis. The point image 157 and the circle of confusion XX are concentric. No change in size of the new image results because of this concentric relation.

Thus, the full-line representation in Figure 12 and hence also that of Figure 5 may be considered to represent graphically what happens when the lens system having the special characteristics above pointed out has its movable component 27 positioned so that the camera is now focused on the point object 155, or, stated differently, when the plane of sharpness is spaced from the film plane 154 by the same distance as the spacing therefrom of the point object 155 while the broken lines of Figure 12 show diagrammatically what happens to light rays emanating from the fixed point object 155 when the movable component 27 of the lens system is shifted to change the focus of the system so as to bring into effect a plane of sharpness whose distance from the film plane 154 is different from the distance therefrom of the point object 155. So-called circles of confusion are considerations characteristic of all photographic lenses but in so far as I am aware, no lens system has heretofore been produced in which the above-mentioned concentricity, achieved by changing focal length without shift of the principal plane, has been brought about. No matter what the change in focus or shifting of the plane of sharpness away from the plane of sharpness through the object point 155, the circle of confusion always stays concentric to the point image 157. Correspondingly, this permanent concentricity establishes the fact that the size of the image of an object in the photographic field of my preferred form of lens system remains constant for all values of focus.

I have above pointed out that, as is well known, change in the focus of a lens system of known type or types when employed in a camera results in change of size of image, where change of focus is achieved by such known methods as shifting the entire lens system relative to the sensitive surface, or shifting one of the lenses of a lens system, or otherwise. Now, such change of size of image arises out of the fact that, with such known methods or systems of changing focus, circles of confusion are produced on the sensitive surface that are eccentric with respect to the in-focus image of the point or points corresponding to which, when the focus is changed, the outer focus circles of confusion are produced. This eccentricity, inevitably, therefore, causes change in size of the out-of-focus image. These vital deficiencies of known methods or apparatus I overcome in my invention in making certain that the out-of-focus circles of confusion are always concentric with the in-focus image of the corresponding point or points, as is perhaps more clearly shown graphically in Figure 12.

The lens system of Figures 5 and 12 employed in carrying out my invention, is, therefore, computed and corrected, with known methods, by the lens computor, on the basis of the maintenance of constancy of size of image (and hence the maintenance of the above-mentioned concentricity) for all positions of the movable lens 27 (within its limited range of movement) while maintaining in fixed position the principal planes though achieving change in the principal focal lengths.

Further detailed data, particularly with respect to a preferred illustrative embodiment of the lens system of my camera, is set forth hereinafter but before further discussing the lens system, the construction and action of which is now clear in view of the foregoing, I wish to refer to and describe a modified form of certain of the mechanism above described in connection with Figures 1, 2 and 3 and shown in detail in Figures 6, 7, 8, 10 and 11.

Figure 6:
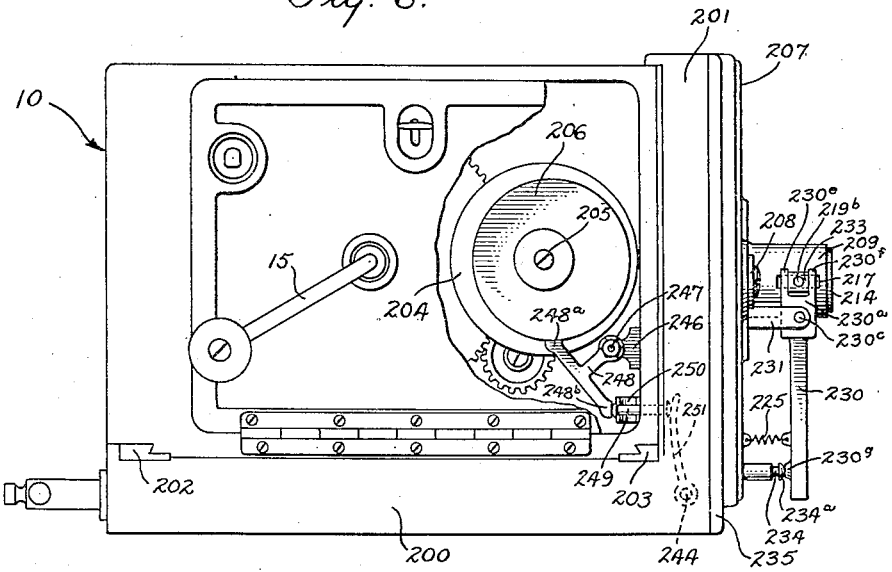
Figure 6 is a side elevation, certain parts being broken away, of a motion picture camera construction embodying a modified and preferred form of lens construction and lens actuating mechanism.
Figure 7:
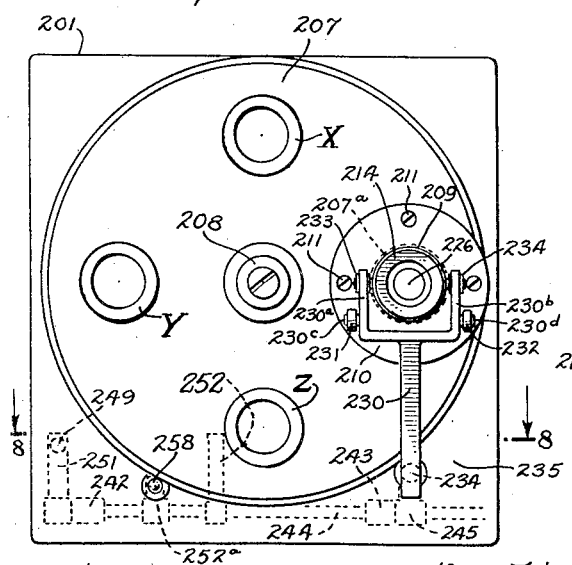
Figure 7 is an elevation as seen from the right in Figure 6, certain parts, however, being omitted in order to show certain features more clearly.

Accordingly, referring first to Figures 6 and 7, I have there shown a preferred form of adaptation of my invention to a type of motion picture camera somewhat different from the type of motion picture camera described above in connection with Figures 1 and 2. There is again shown and generally indicated at 10 a camera casing which is mounted on a hollow base 200, the latter being adapted to be carried upon a tripod, such as the tripod 11 of Figure 4, and having at its forward (right-hand end as viewed in Figure 6) end an upright hollow frame portion 201, the camera casing 10 being slidably carried by the parts 200—201, as in the ways 202—203.

The camera casing 10 is provided with the usual crank 15 (Figure 6) by means of which the camera is operated and the various mechanisms, such as the film-feeding mechanism, the shutter-operating mechanism, and other parts, are driven. Insofar as the structural details of these mechanisms are concerned, these need not be further described inasmuch as they are well known in the art, the particular camera construction being a well-known commercial form of apparatus; an illustrative form of shutter mechanism and film-moving mechanism has been above described in connection with Figures 2 and 3 and that might be considered, for illustrative purposes, as being embodied in the camera construction of Figures 6 and 7. It might be added, however, that the above-mentioned mechanism includes a flywheel 204 mounted on a shaft 205; to this mechanism I attach, preferably on the flywheel shaft 205, a cam 206, the purpose and function of which are described in detail hereinafter.

Upon the front or vertical portion 201 of the frame is rotatably mounted a disk-like plate 207 (corresponding to the plate 30 of Figure 2), suitably provided with means for holding a suitable number of lens or lens systems illustratively and diagrammatically indicated in Figure 7 at $x$, $y$ and $z$ and an illustrative embodiment of the lens system of my invention (as later described), the plate 207 being rotatably carried by a suitable pivot 208 whereby any one of the various lens systems carried by the plate may be positioned for coaction with the film and related mechanism. the film gate (not shown) and shutter (not shown) being effective at the right-hand side of the camera as the latter is viewed in Figure 7.

Upon this plate 207 is mounted my lens system and related parts, and certain preferred features of the mechanical parts of my lens system are better shown in Figure 9.

Referring now to Figure 9, I provide a tube-like housing or sleeve 209 provided with a peripheral flange 210 adjacent its left-hand end, adapted to rest against the plate 207 (Figures 6 and 7), the left-hand portion of the sleeve 209 being received in one of the various lens-receiving apertures in the rotatable plate 207; reference to Figure 7 shows the left-hand end of the sleeve 209 received in an aperture 207a in the plate 207, the flange 210 resting against the latter and being secured thereto as by screws 211.

The inside face 209a (Figure 9) of the sleeve 209 is bored out to provide a nice bearing surface for slidably receiving an auxiliary sleeve 212, both sleeves being of substantial axial extent and thus permitting accurate relative movement therebetween while maintaining their axes geometrically coaxial during such movement.

Auxiliary sleeve 212 has, intermediate its ends, an annulus 213, to which is suitably secured or in which is suitably mounted a lens 227 (corresponding to the lens 27 of Figure 5), this lens 227 being related to and coacting with lenses 226, 228 and 229 (corresponding respectively to the lenses 26, 28 and 29 earlier above described).

Considering for the present the mounting of these coacting lenses, lens 226 is mounted in the inner end of a bushing or lens mount 214 whose right-hand end, as viewed in Figure 9, is threaded into the right-hand end of the fixed housing or sleeve 209, lens 226 being thus made stationary. Lenses 228 and 229 are mounted in the inner end of a tube-like bushing or lens mount 215 whose left-hand end, as viewed in Figure 9, is threaded into the left-hand end of the sleeve 209, these two lenses being thus also held stationary. Any suitable means may be employed to hold these various lenses in their respective lens supports or mounts, as will be understood by those skilled in the art, Figure 9 showing in detail possible mechanical expedients for securing each of the four lenses in their respective holders or mounts. The individual lenses, being preferably and conveniently mounted, are mounted so that their respective optical axes are coincident with the mechanical axis of the bushings or tube-like mounts in which they are respectively supported while the mounts themselves are in turn all related to the main supporting sleeve 209 so that their axes are coincident with the axis of the sleeve 209, and thus coincidence of the optical axes of the different lenses employed is easily achieved and maintained.

When, therefore, the plate 207 (Figures 6 and 7) is rotated to the position shown in Figure 7 and suitably fixed in that position, the lens system above described in connection with Figure 9 is positioned in alinement with the film gate and the locus of operation of the shutter, the parts assuming a relation similar to the relation of the analogous parts as shown in and above described in connection with Figure 2.

At diametrically opposed points and at the sides of the sleeve 209, as viewed in Figure 7, the sleeve 209 is provided with slots 216 and 217 (see Figure 9), the slots extending through the bearing surface 209a above described. Extending into the slots 216—217 and slidably guided thereby are the bearing blocks 218a and 219a, respectively, of trunnions generally indicated at 218 and 219, the latter being provided with pivoting studs 218b and 219b, respectively. The trunnion members 218—219 are secured to the auxiliary or slidable sleeve 212 in any suitable manner, as by way of the screws 220 and 221, respectively (Figure 9).

The bearing blocks 218a and 219a are somewhat shorter than the length in an axial direction of the slots 216 and 217, and thus the trunnion members may be oscillated lengthwise of the supporting sleeve 209 and a similar oscillation or movement conveyed to the slidable sleeve 212 and hence to the movable lens 227. However, the trunnion blocks 218a and 219a are preferably snugly received between the side walls of the slots 216 and 217, respectively, and thus rotational movement of the inner sleeve 212 precluded. Due to the coaxial relations above described, movement of the sleeve 212 relative to the sleeve 209 achieves movement of the movable lens 227 along the optical axis of the lens system.

With the above described mounting (Figure 9) a nice compactness and ruggedness of construction are achieved while at the same time large and enduring bearing surfaces between the sleeves 209 and 212 are provided for maintaining the above described coaxial relation of the lenses throughout long continued use and throughout the repeated and rapid movements of the movable lens; it will be noted that, though the lenses (see Figure 9) are relatively close and compactly grouped, nevertheless, by reason of the telescopic character of the lens mounts 214 and 215 with respect to the slidable sleeve 212 and with respect to the main supporting sleeve 209, the annular chamber 222 is of large proportions to achieve the large bearing and supporting surfaces through which the movable sleeve 212 and the fixed sleeve 209 contact. This chamber 222, moreover, is virtually air-tight and thus access of foreign matter to the inside faces of lenses 226 and 229 and to the faces of lenses 227 and 228 is dependably precluded. Inasmuch as the movable lens 227 with its supporting ring or annulus 213 virtually sub-divides this closed chamber 222, the supporting part 213 is apertured as at 223 to permit displacement of air within the chamber 222 from one side of the lens 227 to the other as this lens is subjected to movement as hereinafter described and thus possible resistance to free and easy movement of the movable lens cut down.

The movement of the lens 227, during exposure of the film, is effected by means operating upon the studs 218b and 219b of the above described trunnions and illustratively and preferably this means includes a forked lever 230 (Figures 6 and 7) whose forked arms 230a and 230b (Figure 7) extend each to one side of the stationary supporting sleeve 209; the lever 230 is pivoted to swing about a horizontal axis preferably at an axis positioned intermediate the upper and lower ends of the lever 230 and illustratively the pivotal mounting of the lever 230 may comprise two horizontally spaced posts 231 and 232 suitably secured to the flange 210 (Figures 6 and 7) of the supporting sleeve 209. These posts are horizontally spaced (Figure 7) and they extend at right angles to the flange 210, receiving therebetween the spaced arms 230a and 230b of the lever 230 (Figure 7), these arms having studs 230c and 230d, respectively, received in suitable bearings or apertures in the outer ends of the posts 231—232.

Each arm 230a and 230b of the lever 230 is itself bifurcated or forked, as is better shown in Figure 6, where arm 230a appears in side elevation and from which the horizontally spaced but parallel portions 230e and 230f of the arm 230a are clearly shown. In a similar way arm 230b is bifurcated.

In between the parallel forked portions 230e and 230f (Figure 6) is received and thereby guided for vertical sliding movement a bearing block 233 suitably apertured to receive the pivot stud 219b (Figures 6, 7 and 9) of the trunnion 219. In a similar manner a bearing block 234 (Figure 7) is mounted for vertical sliding movement relative to the two forked portions of the arm 230b and is apertured to receive the pivot stud 218b of the trunnion 218.

Thus, as the lever 230 is moved about the axis of the pivotal mounting provided by the spaced supports 231—232, the upper forked or spaced arms 230a—230b thereof are moved throughout a slight arc in the general direction of the axis of the supporting sleeve 209 but due to the pivotal and slidable connection of the arms 230a—230b with the trunnions 219 and 218, respectively, the latter and hence the movable lens 227 partake of a straight-line movement in the direction of the axis of the sleeve 209.

Considering now the drive of the movable lens 227 from the main shaft 205 (Figure 6) of the camera mechanism, it is first to be noted that the inner face of the lower end of the lever 230 (Figure 6) is provided with a boss 230g whose face is concaved, thus to provide a seat for the head 234a (Figures 6 and 8) of a plunger 234 slidably mounted in the vertical right-hand end wall 235 of the upright frame portion 207 (Figures 6 and 8) of the camera 10.

Figure 8:
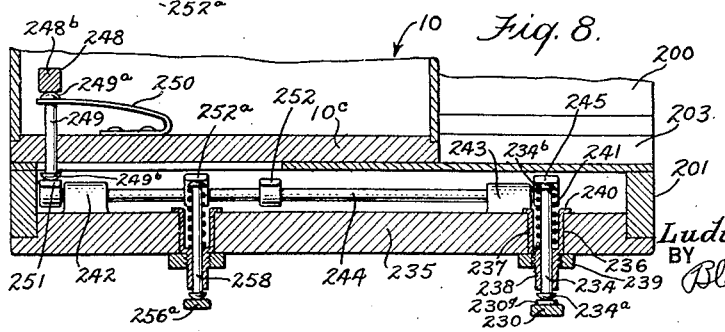
Figure 8 is a horizontal sectional view on an enlarged scale as seen along the line 8—8 of Figure 7.

In Figure 8 this plunger and certain related parts are better shown on a larger scale. More specifically, it will be seen that, in a suitable hole 236 in the wall 235 there extends a sleeve 237 whose lower portion 238 is of lesser diameter and forms a sliding bearing for the plunger 234, both parts being of round cross-section. This portion 238 also is threaded to receive a nut 239 which, in coaction with a flange 240 at the innermost end of the larger-diametered part 237 serves to secure the sleeve 237—238 in the hole 236 and hence to the wall 235.

In the space between the plunger 234 and the part 237 is accommodated a spring 241 whose upper end abuts against the head 234b of the plunger 234, thus tending to urge the plunger 234 inwardly through the wall 235.

Upon the interior and lower portions of the wall 235, however, I provide suitable spaced bearings 242—243 (Figures 6, 7 and 8) and in these bearings is supported a shaft 244. At its right-hand end, as viewed in Figures 7 and 8, shaft 244 has rigidly secured to it a lever or arm 245 whose upper end contacts with the inner end of the plunger 234, the spring 241 maintaining such contact throughout whatever oscillating or rotary movement, as hereinafter described, is given the shaft 244 and hence the arm 245. Thus a swinging of the shaft 244 about its axis effects, through arm 245, a movement of translation of the plunger 234, spring 241 insuring that the plunger 234 responds to such movement of the arm 245 irrespective of the direction in which the shaft 244 is swung about its axis. Such movement of translation of the plunger 244 (see Figures 6, 7 and 8) transmitted in turn to the lever 230, with mechanical results upon the lens 227, as has already above been described.

As shown in Figure 6, a spring 225 acts upon the lens-moving lever 230 to make certain that that lever faithfully follows the movements of the plunger 234; spring 225 may conveniently be a tension spring and connected between lever 230 and the plate 207.

The shaft 244 is oscillated by mechanism driven from a shaft of the motion picture camera mechanism, illustratively the shaft 205 which, as above already noted, I have provided with a cam 206 (Figure 6); it is from cam 206 that the oscillatory motion of shaft 244 is derived. Illustratively and still referring to Figure 6, there is provided upon an interior wall of the camera casing 10 a bracket or stud 246 which provides a pivot 247 for a T-shaped lever 248 whose one end 248ᵃ bears against the peripheral face of the cam 206. Any suitable coacting surfaces may be provided for these two contact parts to insure long life and resistance to wear and illustratively these two parts may be made of hardened steel.

The other end 248ᵇ of the lever 248 (see also Figure 8) bears against a spring-pressed plunger 249 that extends through the wall 10ᶜ (Figure 8) of the camera casing 10 and is slidably guided thereby; the spring urges the plunger 249 inwardly of the casing 10 and illustratively the spring may take the form of a leaf spring 250 secured to the casing 10 and having its one end engaging against the under face of the head 249ᵃ of the plunger 249. The spring 250 insures that the plunger 249 is reciprocated faithfully in response to the oscillation of the lever 248 (Figure 8), and insures also that the latter lever 248 maintains contact with the cam 206 and faithfully responds to the cam-shaped periphery of the cam 206.

The outer end of plunger 249 (Figures 8 and 6) has a rounded head 249ᵇ which, in the position of the casing 10 relative to the supporting frame 200—201, as shown in Figure 8, engages an arm 251 on the shaft 244, arm 251 being in turn spring-pressed against the plunger 249 by the action of spring 241 upon the plunger 234 (Figure 8). The operative connection between plunger 249 and lever 251 is, moreover, detachable or capable of disconnection, for purposes presently to be described.

With the camera casing 10 moved along the ways 202—203 (Figure 6) into the position shown in Figure 8, the film and shutter and related mechanism become displaced laterally of the optical axis of the lens system so that the operator may sight through the lens system, in the usual manner, to preview the scene or object which it is proposed to photograph. When the parts are in this relative position, the operative connection between plunger 249ᵇ (Figure 8) and the lever arm 251 on shaft 244 is established, whereupon operation of the crank 15 (Figure 6) while the operator is sighting through the lens system effects the above-described movement of the movable lens 227 (Figure 9) so that the operator can see with the naked eye what is later to be recorded upon the film itself.

When the operator is ready to photograph or to expose the film, the camera casing 10 is moved along the ways 202—203 in a direction toward the right, as viewed in Figure 8, thus bringing the shutter and film gate and related parts into appropriate cooperative relation or alinement with the optical axis of the lens system but in so doing the operative connection between plunger 249ᵇ and lever arm 251 on shaft 244 is disrupted but a new operative connection between plunger 249 and shaft 244 is established; this new operative connection is brought about by a second lever arm 252 (Figure 8) on shaft 244, lever arms 251 and 252 being of identical construction but spaced along the shaft 244 by the distance throughout which the camera casing 10 is displaceable relative to the supporting frame 200 to achieve the above-mentioned sighting position in the one case and the operative or photographing position in the other. Hence the oscillation of shaft 244 and likewise the movement of the movable lens 227 are achieved irrespective of the relative positions of these parts, the yieldability imparted to arms 251 and 252 by reason of the spring 241 associated with the plunger 234 in coaction with the rounded or cam-like head 249ᵇ on the plunger 249 insuring ease and dependability of making or disrupting these operative connections.

Moreover, referring to Figures 6, 7 and 8, the operative connection between the lens-moving lever 230 and the plunger 234 is likewise detachable so that, in the case it is desired to make operative any other lens system (such as any one of the lens systems X, Y and Z of Figure 7) carried by the rotatable plate 207 (and which lens system may or may not embody the features of my lens action forming part of my invention), the operative connection between lever 230 and plunger 234 may be easily disrupted or remade as the disk 207 is rotated out of the position shown in Figure 7, or is returned to that position.

Reserving for later description certain details and action of the lens system of Figure 9 which, however, will already be clear in view of what has above been set forth in connection with Figures 1–5, I wish first to point out that I may, if desired, relate to the lens system and mechanism of Figures 6–9 inclusive a means for controlling the amount of light admitted to the lens system synchronously with the movement of the movable lens and in so doing, and for purposes of illustration, I may and prefer to employ the four plates 76, 79, 96 and 108 and their operating mechanism for controlling the size of the rectangular opening 115 substantially exactly as shown in Figures 1, 2 and 3, and in Figures 10 and 11 I have shown these parts and the related controlling mechanism, all, however, related to the plate 207 and carried thereby, and related to the lens tube or mounting 209 above described in connection with Figures 6–9. In view of the detailed description of the mounting of and control mechanism for these four plates with respect to Figures 1, 2 and 3, it will suffice, with respect to Figures 10 and 11, simply to note that these parts are all shown in the latter two figures and identified by the same reference characters employed in Figures 1, 2 and 3.

However, the lever 68 in Figures 10 and 11, instead of being actuated directly by a cam like cam 66 of Figures 1 and 2, is actuated from the shaft 244 of Figure 8 through mechanism which imparts to the lever 68, and hence to the four plates that determine the opening 115 through which light is admitted to the lens system and hence to the film, the required synchronous motion; referring to Figures 10 and 11, I provide a link 253 pivoted as at 254, at its upper end, to the lever 68 and pivotally connected as at 255, at its lower end, to a bell crank lever 256 which is pivoted as at 257 in a suitable bracket secured to or carried on the front face of the rotatable plate 207. The link 253 may be slightly curved as at 253ª to by-pass the leaf spring 88 (see Figure 11).

The vertical arm 256ª of the bell crank lever 256 projects downwardly beyond the periphery of the plate 207 (Figures 10 and 11) where it engages a plunger 258 identical in construction with, and similar as to its mounting with respect to the wall 235 (Figure 8) as, the plunger 234 above described in connection with Figure 8; in Figure 8 plunger 258 is shown and its identity to plunger 234 and the mounting of the latter is clearly apparent, being also springpressed inwardly. However, plunger 258 contacts with an arm 252ª on shaft 244, like arm 252, already above described, and due to the oscillation of shaft 244 in the manner already above described and irrespective of whether the plunger 249 (Figure 8) contacts with arm 251 or 252, plunger 258 is caused to partake of a corresponding reciprocation and thus bell crank lever 256 (Figure 11) is correspondingly oscillated and the motion of oscillation transmitted to the lever 68 (Figures 10 and 11) with changes in the size of the light-emitting opening 115 that will be clear in view of what has already been set forth in connection with Figures 1, 2 and 3. As was the case with the mechanism of the latter figures, the changes in size of the light-emitting opening 115, in the apparatus of Figures 10 and 11, take place in step with or in synchronism with the changes in position of the movable lens 227 (Figure 9) of the lens system.

Moreover, it will be seen that the operative connection between bell crank lever 256 (Figures 11 and 8) and the plunger 258 is detachable, just as is the connection between the lens-actuating lever 230 (Figure 6) with the plunger 234. Thus, ease and speed of assembly or disassembly or replacement or change in position of the various parts may be readily achieved.

The specific form of lens system or rather of the individual lenses shown in Figure 9 has, as is now clear, the characteristics of action, correction and result above described in connection with the illustrative form of lens system or individual lenses of Figures 2 and 5, certain aspects of which are shown diagrammatically dealt with in Figure 12 and hence, as the crank 15 (Figure 6) is turned and the shaft 205 rotated, the lens 227 (Figure 9) is given an axial movement in one direction and back again to its original position for each rotation of the shaft 205 and hence for each actuation of the shutter (not shown) and hence also for each exposure of the successive frames on the motion picture film. The film, where it is a motion picture film, remains stationary during the interval of time that the shutter is effective to expose the frame on the film and the shutter closes off the light from access to the film, thus to shield the film, while the film is being moved by the shuttle mechanism to bring the next frame thereof to position to be affected by the images formed by the lens system.

Preferably the relation between the cam surfaces of cam 206 (Figure 6) to the shutter drive is such that the lens 227 is given its full range of movement in one direction while the film is exposed and is returned in the opposite direction while the shutter is closed. Thus, each frame of the film has impressed upon it, due to the action of the lens system and due to the coaction of the various characteristics of the fixed lenses with the characteristics of the movable lens as the latter is moved during exposure, a multitude, infinite in number, of registering images of the scene or object, each image corresponding to a different focus of the lens system and hence corresponding to a different plane of sharpness. As already above noted, the in-focus and out-of-focus images are all of the same size and register on the film or film plane, and thus clarity, sharpness, and absence of blurring, are dependably achieved regardless of the "depth" of the scene or regardless of the varying distances from the camera of different portions of or objects in the scene.

Actuated synchronously with the above described movement of the movable lens 227 is, as will now be clear, the lever 68 (Figures 10 and 11) whereby the size of the light-emitting opening 115 formed by the plates 76, 79, 96 and 108 is varied, and the mechanism is preferably so related, as already above described in connection with Figures 6–11 inclusive, that, as the lens 227 moves to bring into effect planes of sharpness more remote from the camera, these plate members are moved apart from each other so as to increase the size of the opening 115, and vice versa. Thus, as objects in or portions of the scene at varying distances from the camera are brought into sharpness in the image affecting the film, the amount of light admitted to the film through the lens system is changed, the amount of light being increased for objects in or portions of the scene relatively far away from the camera and being decreased for portions of or objects in the scene relatively near the camera. Though I achieve highly efficient and excellent results without the use of this coacting light-varying mechanism and hence may carry on photography without that mechanism, I find it, under certain circumstances of use, of important advantage and coaction.

Considering now more in detail certain structural details of the preferred and specific form of lenses making up the system of Figure 9, it is first to be understood that the various optical characteristics and coactions and corrections above described in considerable detail in connection with the lenses 26, 27, 28 and 29 with particular reference to the optical diagrams of Figures 5 and 12, apply to or are embodied in the specific lens system of Figure 9, and those numerous and detailed considerations need not therefore be at this point repeated, it being understood that, depending upon such factors as the character of the glasses employed and their indices of refraction, the physical structure or appearance of the individual lenses may vary though still embodying the principles and optical characteristics and corrections of my invention as above already set forth in detail.

Referring now to Figure 9, in which, as above set forth, is shown a preferred embodiment of a lens system embodying my invention, as above described, the lens system of Figure 9 and the individual lenses have the following physical characteristics which result from the application of the optical principles and optical prescriptions and corrections above set forth in detail:—

*Lens 226 (Figure 9).*—This lens is the postive front lens; it is made of a glass having an index of refraction, for the d line, of 1.6110 and a dispersion of 55.8, and it is double convex. The radius of curvature of its face a (see Figure 9) is 16.0 millimeters and the radius of curvature of its face b is 41.0 mm. It has a thickness at the optical axis of 3.5 mm. and a diameter of 14.5 mm.

*Lens 227.*—The movable lens 227 is a double concave lens, being made of a glass having an index of refraction for the d line of 1.5798 and a dispersion of 41.0. The radius of curvature of face c is 23.0 mm. and the radius of curvature of face d is 16.0 mm. It has a thickness at the optical axis of 0.66 mm. and it has a diameter of 17.0 mm.

*Lens 228.*—This lens is a concavo-convex lens, being made of a glass having an index of refraction for the d line of 1.5798 and a dispersion of 41.0. The radius of curvature of face e is 11.5 mm. and the radius of curvature of face f is 13.0 mm. It has a thickness of 1.0 mm. at the optical axis and it has a diameter of 14.5 mm.

*Lens 229.*—This lens is a concavo-convex lens, being made of a glass having an index of refraction for the d line of 1.6100 and a dispersion of 55.8. The radius of curvature of face g is 64.0 mm. and the radius of curvature of face h is 17.5 mm. It has a thickness at the optical axis of 2.1 mm. and its diameter is 14.5 mm.

The spacing between lenses 229 and 228, that is the distance along the optical axis from face g to face f is 0.03 mm. The spacing between lens 228 and lens 226, that is the distance along the optical axis from face e to face b is 5.26 mm.

The range of movement of lens 227 sufficient to move the focus or plane of sharpness from a point about 3 feet from the lens to a point infinitely remote is 0.30 mm. That is if the next plane of sharpness to be brought into effect is desired to be approximately 3 feet to the right of the lens system as viewed in Figures 6–9, the lens 227 assumes a position such that the spacing between the faces c and b is 1.25 mm. while, to cause the plane of sharpness or focus to sweep through the entire depth of the scene during exposure, the lens 227 is moved to a point such that this spacing between faces c and b is 0.95 mm., the focus or depth of sharpness at that spacing being substantially at infinity. During exposure, therefore, and where it is desired to change the focus or plane of sharpness from one of the above-mentioned limits progressively to the other of these limits, the lens 227 is given a movement of about 0.3 mm. to change the spacing between the faces c and b from 0.95 mm. progressively to 1.25 mm.

The spacing from face h (Figure 9) of the innermost lens 229 to the film plane or film is the back focus and is substantially 47.3 mm. and the focus or distance of the optical lens system to the light sensitive surface or film plate or film is substantially 50 mm.

The mechanical or physical data immediately above set forth typifies a preferred physical embodiment of the lens system of my invention and typifies the corrections and coactions and results above set forth in detail.

The mechanism above described in detail is, of course, proportioned to give the movable lens 227 a range of movement like that above specified. Such movement, as will now be clear, takes place during each exposure, the movement being synchronized with the opening action of the shutter and, where the camera is a motion picture camera, taking place during a halting in the movement of the film where the motion picture camera is of the type in which the film partakes of successive advance movements and haltings.

There is thus registered or impressed upon the film, during each exposure, a great multitude of in-focus and out-of-focus images, the in-focus images ranging from a focus corresponding to a plane of sharpness near the camera to a focus corresponding to a plane of sharpness as remote from the camera as the most distant point in the depth of the scene; for each in-focus image there is at least one out-of-focus image but because of the above-described characteristics of the lens system all of these in-focus and out-of-focus images of the same object or of the same portion of the scene are of the same size and register on the film. Thus, there is no blurring and a nice evenness of result appears on the film and on any positive, print, or projection, that results from the initial negative. Other aspects of the unique results achieved have been dealt with hereinabove and will now be entirely clear.

It will thus be seen that there has been provided in this invention an apparatus in which the various objects hereinbefore set forth, together with many thoroughly practical advantages are successfully achieved.

As many possible embodiments may be made of the above invention, and as many changes might be made in the embodiment above set forth, it is to be understood that all matter hereinbefore set forth or shown in the accompanying drawings, is to be interpreted as illustrative and not in a limiting sense.

I claim:

1. In photographic apparatus, in combination, a lens system adapted to form images of objects in a scene, means adapted to move a strip of film through a position to be affected by said images, means adapted to control the passage of light rays through said lens system and to said film to expose successive portions of said strip to said images each for an interval of time, means adapted during each of said intervals of time to change the relation between said lens system and the portion of said strip being exposed to bring different planes of the scene into sharpness in the image affecting said film, and means adapted during each of said intervals to change the amount of light admitted to the strip through said lens system as said different planes are brought into sharpness.

2. In photographic apparatus, in combination, a lens system adapted to form images of objects in a scene, means adapted to move a strip of film through a position to be affected by said images, means adapted to control the passage of light rays through said lens system and to said film to expose successive portions of said strip to said images each for an interval of time, a rotating shaft for driving said last means, a mechanism adapted when actuated to change the relation between said lens system and the portion of said strip being exposed to bring different planes in the scene into sharpness in the image affecting said film, and means driven from said rotating shaft for actuating said mechanism during an exposure of a portion of said film.

3. In photographic apparatus, in combination, a lens system adapted to form images of objects in a scene, means adapted to move a strip of film through a position to be affected by said images, means adapted to control the passage of light rays through said lens system and to said film to expose successive portions of said strip to said images each for an interval of time, a rotating shaft for driving said last means, a mechanism adapted when actuated to change the relation between said lens system and the portion of said strip being exposed to bring different planes in the scene into sharpness in the image affecting said film, means driven from said rotating shaft for actuating said mechanism, a second mechanism adapted when actuated to change the amount of light admitted to said film through said lens system, and means driven from said rotating shaft for actuating said second mechanism.

4. In photographic apparatus, in combination, a lens system adapted to form images of objects in a scene, means adapted intermittently to move a strip of film through a position to be affected by said images, said lens system including a positive front lens, a negative lens, and corrective lens means, the positive lens being double convex and having faces whose radii of curvature are respectively on the order of 16 and 41 millimeters, said negative lens being double concave and having faces whose radii of curvature are respectively on the order of 23 and 13 millimeters, said corrective lens means comprising two concavo-convex lenses, the first of which has faces whose radii of curvature are respectively on the order of 12 and 13 millimeters and the second of which has faces of radii of curvature on the order of 64 and 18 millimeters, said lenses being made of glass having an index of refraction on the order of 1.6, whereby upon movement of said negative lens relative to the remaining lenses, said lens system changes the focus from a plane adjacent the lens system relatively remote therefrom and maintains the same size of image on the exposed portion of said film for all in-focus and out-of-focus images throughout the range of change of focus, a shutter for controlling the passage of light rays to said film, means adapted to open said shutter for an interval of time at each stoppage of said film, means adapted during each of said intervals of time to move said movable lens so as to move the focus of the lens system in one direction between a plane relatively near thereto and a plane at a substantial distance away therefrom, and adapted between said intervals of time to move said lens in the opposite direction, adjustable means adapted to control the amount of light admitted to said film through said lens system, and means adapted to affect said last means to progressively vary the amount of light admitted to said film, during each of said intervals of time, as the focus of the lens system is changed.

5. A camera for recording pictures that exhibit the illusion of relief or depth of the scene or object itself, comprising, in combination, means for supporting a strip of sensitized photographic film, a lens system through which a portion of said film is exposed to the scene or object, said lens system comprising a positive front lens, a positive rear corrective lens, and a spaced intermediate negative lens, said system having fixed principal planes, means mounting said negative lens for axial movement, mechanism for effecting movement of said strip of film relative to said lens system and for exposing successive portions thereof to light rays passing through said lens system, and mechanism operating synchronously with said first-mentioned mechanism for moving the movable lens within its range of movement during each exposure of the successive portions of said film.

6. A photographic camera for impressing upon a sensitized photographic element a plurality of images of an object or scene, each image corresponding to a different plane of sharpness and each image being of the same size, comprising in combination, means for holding a sensitized camera element, a lens system through which said sensitized element is exposed to a scene or object, said lens system comprising a plurality of lens means, coaxially arranged, at least one of said lens means being movable axially throughout a certain range to change the focal length of the lens system, said lens system having fixed principal planes throughout the range of movement of said movable lens means, whereby said images of said object or scene are in substantial registry, a shutter for exposing said sensitized element through said lens system to said scene or object, means for moving said movable lens means within said range of movement, a variable diaphragm comprising a plurality of relatively movable members for controlling the amount of light transmitted from the scene or object through the lens system onto said sensitized camera element, means adapted upon actuation to relatively shift said movable members of said diaphragm thereby to vary the aperture provided by said diaphragm, and means operating during the interval of time that said sensitized element is exposed by said shutter for operating said lens-moving means and said diaphragm-actuating means.

7. A photographic camera for impressing upon a sensitized photographic element a plurality of images of an object or scene, each image corresponding to a different plane of sharpness and each image being of the same size, comprising, in combination, means for holding a sensitized camera element, a lens system through which said sensitized element is exposed to a scene or object, said lens system comprising a plurality of axially arranged lenses, an intermediate lens of which is a negative lens and is movable axially within a certain range relative to the remaining lenses, said lens system having, throughout said certain range of movement of said negative lens, fixed principal planes, whereby said images are in substantial registry on the sensitized element for all positions of said movable lens, a shutter, a rotatable member for moving said shutter to expose said sensitized element for a certain time interval, means mounting said movable lens for movement axially and within said certain range, and cam means driven from said rotatable member for actuating said lens-mounting means during the interval of exposure of said sensitized element.

8. A photographic camera for impressing upon a sensitized photographic element a plurality of images of an object or scene, each image corresponding to a different plane of sharpness and each image being of the same size, comprising, in combination, means for holding a sensitized camera element, a lens system through which said sensitized element is exposed to a scene or object, said lens system comprising a plurality of axially arranged lenses, an intermediate lens of which is a negative lens and is movable axially within a certain range relative to the remaining lenses, said lens system having, throughout said certain range of movement of said negative lens, fixed principal planes, whereby said images are in substantial registry on the sensitized element for all positions of said movable lens, a shutter for exposing said sensitized element to said scene or object, means mounting said movable lens for movement axially, means for moving said movable lens within said range of movement, and actuating mechanism operatively interrelating said shutter and said lens-moving means for operating said lens-moving means during the period of time when said shutter exposes said sensitized element.

9. In photographic apparatus, in combination, a lens system for forming images of an object or a scene with a change in focus and for causing in-focus and out-of-focus images to register, said lens system including a front positive lens, a negative lens and corrective lens means, the positive lens having a convex face toward the object or scene having a radius of curvature on the order of 16 mm., said negative lens being double concave and having faces whose radii of curvature are respectively on the order of 23 mm. and 13 mm., said corrective lens means comprising two lenses at least one of which has a concave face, and means for moving said negative lens along the optical axis throughout a relatively small distance, said positive front lens and said negative lens being image-forming and being corrected to give concentricity of circles of confusion produced by changes of focus with respect to the in-focus images of any point objects, when said movable lens is moved to change the focus.

10. In photographic apparatus, in combination, a lens system for forming images of an object or a scene with a change in focus and for causing in-focus and out-of-focus images to register, said lens system including two groups of lenses, a front group and a rear group, said front group comprising at least two lenses and being the image-forming lenses and the rear group being corrective lenses and including two lenses, said front group comprising a positive front lens and a negative lens, means mounting said negative lens for movement along the optical axis within a certain range, and means for moving said negative lens along the optical axis, said lenses having corrections so that change of focus takes place during movement of said negative lens within said range without shifting the positions of the principal planes.

11. A lens system comprising a plurality of lenses, one of which is movable, said lens system comprising, in order, a front lens ($L_{226}$), a movable lens ($L_{227}$), a third lens ($L_{228}$), and a fourth lens ($L_{229}$), the lenses being made and spaced from each other substantially in conformity with the following constructional data:—

| | | |
|---|---|---|
| $L_{226}$ | $r_a = 16.0$ mm. | $T_{a-b} = 3.5$ mm. |
| | $r_b = 41.0$ mm. | |
| $L_{227}$ | $r_c = 23.0$ mm. | $T_{c-d} = 0.66$ mm. |
| | $r_d = 16.0$ mm. | $S_{b-c} = 5.25$ mm. |
| $L_{228}$ | $r_e = 11.5$ mm. | $T_{e-f} = 1.0$ mm. |
| | $r_f = 13.0$ mm. | |
| $L_{229}$ | $r_g = 64.0$ mm. | $T_{g-h} = 2.1$ mm. |
| | $r_h = 17.5$ mm. | $S_{f-g} = 0.03$ mm. | in which "$r$" are radii of curvature, "$T$" are lens thicknesses along the optical axis, and "$S$" are the spaces between lenses, the lenses being made of a glass having an index of refraction for the $d$ line on the order of 1.6.

12. In apparatus of the character described, in combination, a motion picture camera having a driving element for driving the film, said camera including a lens-carrying plate, means movably mounting said plate relative to said camera, a plurality of lens systems carried by said plate including a lens system one of whose lenses is movable, and means including a driving train extending from said driving element to said movable lens, said driving train including disruptable connection means actuated when said plate is moved.

13. In apparatus of the character described, in combination, a motion picture camera having a driving element for driving the film, said camera including a lens-carrying plate, means movably mounting said plate relative to said camera, a plurality of lens systems carried by said plate including a lens system one of whose lenses is movable, and means including a driving train extending from said driving element to said movable lens, mechanism including an arm carried by said plate and adapted upon oscillation to move said movable lens, said arm being movable with said plate, and means operable from said driving element for engaging said arm when said plate is moved to bring said last-mentioned lens system into operative position, for oscillating said arm.

14. In apparatus of the character described, in combination, a camera having means for holding a sensitized photographic element and a shutter, means for operating said shutter to expose said sensitized photographic element, a lens-carrying plate, means movably mounting said plate relative to said camera, a plurality of lens systems carried by said plate including a lens system one of whose lenses is movable, and means including a driving train extending from said shutter-operating means to said movable lens, said driving train including disruptable connection means actuated when said plate is moved.

15. In apparatus of the character described, in combination, a camera having means for holding a sensitized photographic element, lens means through which said sensitized element may be exposed, a plate-like member, means movably mounting said plate-like member for movement relative to said camera, a variable diaphragm carried by said plate-like member, and means for varying said diaphragm during exposure of said sensitized element and including a driving train, a part of which is carried by said camera and another part is carried by said plate-like member and is operatively connected to said variable diaphragm, said driving train including disruptable connection means actuated when said plate-like member is moved.

16. In photographic apparatus, in combination, a lens system adapted to form images of objects in a scene, means for holding a sensitized photographic element in a position to be affected by said images, said lens system including a positive front lens, a negative lens, and corrective lens means, the positive lens being double convex and having faces whose radii of curvature are respectively on the order of 16 and 41 millimeters, said negative lens being double concave and having faces whose radii of curvature are respectively on the order of 23 and 13 millimeters, said corrective lens means comprising two concavo-convex lenses, the first of which has faces whose radii of curvature are respectively on the order of 12 and 13 millimeters and the second of which has faces of radii of curvature on the order of 64 and 18 millimeters, said lenses being made of glass having an index of refraction on the order of 1.6, whereby upon movement of said negative lens relative to the remaining lenses, said lens system changes the focus from a plane adjacent the lens system relatively remote therefrom and maintains substantially the same size of image on the exposed portion of said film for all in-focus and out-of-focus images throughout the range of change of focus, means for effecting exposure of said sensitized photographic element through said lens system, and means operable during said exposure for effecting movement of said movable lens.

17. In apparatus of the character described, in combination, a base having means at one portion thereof for supporting a lens system, a lens system supportd in said supporting means, said lens system having movable lens means therein, a camera having means for supporting a sensitized photographic element, said camera being mounted on said base for movement transversely of the latter whereby said camera with its photographic element may be moved into or out of operative relation to said lens system, a driving element carried by said camera and movable therewith, and driving connections between sa'd driving element and said movable lens means for moving the latter and operative to move said movable lens means either when said camera is in operative relation to said lens system or when said camera is out of operative relation therewith.

18. In apparatus of the character described, in combination, a base having means at one portion thereof for supporting a lens system, a lens system supported in said supporting means, said lens system having movable lens means therein, a camera having means for supporting a sensitized photographic element, said camera being mounted on said base for movement transversely of the latter whereby said camera with its photographic element may be moved into or out of operative relation to said lens system, mechanism carried by said base which mechanism, when actuated, moves said movable lens means, a driving element carried by said camera and movable therewith, and means connecting said driving element and said mechanism and operative to operate the latter from the former in either position of said camera relative to said lens system.

19. In apparatus of the character described, in combination, a base having means at one portion thereof for supporting a lens system, a lens system supported in said supporting means, said lens system having movable lens means therein, a camera having means for supporting a sensitized photographic element, said camera being mounted on said base for movement transversely of the latter whereby said camera with its photographic element may be moved into or out of operative relation to said lens system, shutter-actuating mechanism carried by said camera whereby said photographic element may be exposed through said lens system, mechanism carried by said base which mechanism when actuated moves said movable lens means, and means whereby an operative connection between said two mechanisms is maintained irrespective of whether said camera is operatively related to said lens system or is out of operative relation thereto.

20. In apparatus of the character described, in combination, a base having means at one portion thereof for supporting a lens system, a lens system supported in said supporting means, said lens system having movable lens means therein, a camera having means for supporting a sensitized photographic element, said camera being mounted on said base for movement transversely of the latter whereby said camera with its photographic element may be moved into or out of operative relation to said lens system, shutter-actuating mechanism carried by said camera whereby said photographic element may be exposed through said lens system, an oscillatable member carried by said base, connections between said oscillatable member and said movable lens means for oscillating the latter therefrom, and means for transmitting oscillatory movement to said oscillatable member from said shutter-operating mechanism.

21. In apparatus of the character described, in combination, a base having means at one portion thereof for supporting a lens system, a lens system supported in said supporting means, said lens system having movable lens means therein, a camera having means for supporting a sensitized photographic element, said camera being mounted on said base for movement transversely of the latter whereby said camera with its photographic element may be moved into or out of operative relation to said lens system, shutter-actuating mechanism carried by said camera whereby said photographic element may be exposed through said lens system, an oscillatable member carried by said base, connections between said oscillatable member and said movable lens means for oscillating the latter therefrom, and means operative in either of said positions of said camera relative to said base for transmitting oscillatory motion to said oscillatable member from said shutter-operating mechanism.

22. A camera having, in combination, means for holding a sensitized photographic element, a shutter through which said photographic element may be exposed to a scene or object, a lens system for controlling the light rays passing from said scene or object to said photographic element, said lens system comprising a plurality of lenses, one of which is movable, said plurality of lenses being in order, a front lens ($L_{226}$), a movable lens ($L_{227}$), a third lens ($L_{228}$), and a fourth lens ($L_{229}$), the lenses being made and spaced from each other substantially in conformity with the following constructional data:—

| | | |
|---|---|---|
| $L_{226}$ | $r_a=16.0$ mm. | $T_{a-b}=3.5$ mm. |
| | $r_b=41.0$ mm. | |
| $L_{227}$ | $r_c=23.0$ mm. | $T_{c-d}=0.66$ mm. |
| | $r_d=16.0$ mm. | $S_{b-c}=5.25$ mm. |
| $L_{228}$ | $r_e=11.5$ mm. | $T_{e-f}=1.0$ mm. |
| | $r_f=13.0$ mm. | |
| $L_{229}$ | $r_g=64.0$ mm. | $T_{g-h}=2.1$ mm. |
| | $r_h=17.5$ mm. | $S_{f-g}=0.03$ mm. | in which "$r$" are radii of curvature, "$T$" are lens thicknesses along the optical axis, and "$S$" are the spaces between lenses, the lenses being made of a glass having an index of refraction for the $d$ line on the order of 1.6 and where the range of movement of the movable lens ($L_{227}$) is on the order of 0.3 mm., and means for effecting movement of said movable lens during exposure of said photographic element.

23. A camera as claimed in claim 22 having therein means for synchronizing the movement of the movable lens with the actuation of the shutter.

24. In photographic apparatus, in combination, a lens system for forming images of an object or scene with a change in focus and for causing in-focus and out-of-focus images to register, said lens system comprising a positive front lens, a positive rear corrective lens, and a spaced intermediate negative lens, means mounting said negative lens for axial movement throughout a certain range, said lens system having fixed principal planes throughout said range of movement of said negative lens, and means to move said movable lens within said range of movement.

25. In photographic apparatus, in combination, a lens system for forming images of an object or scene with a change in focus and for causing in-focus and out-of-focus images to register, said lens system comprising front lens means and rear lens means, said front lens means being image-forming and said rear lens means being corrective, said front lens means comprising a positive front lens and a negative lens, movable means mounting said negative lens for movement along the optical axis, means restricting said movement of said movable mounting means and hence of said negative lens to a certain range, said lens system having fixed principal planes throughout said range of movement of said movable lens, and means operating upon said mounting means for moving it and hence said negative lens within said range as restricted by said restricting means.

26. In photographic apparatus, in combination, a lens system adapted to form images of objects in a scene, means for holding a sensitized photographic element in a position to be affected by said images, said lens system including a positive front lens, a negative lens, and corrective lens means, the positive lens being double convex and having faces whose radii of curvature are respectively on the order of 16 and 41 millimeters, said negative lens being double concave and having faces whose radii of curvature are respectively on the order of 23 and 13 millimeters, said lenses being made of glass having an index of refraction on the order of 1.6, whereby upon movement of said negative lens relative to the remaining lenses, said lens system changes the focus from a plane adjacent the lens system relatively remote therefrom and maintains substantially the same size of image on the exposed portion of said film for all in-focus and out-of-focus images throughout the range of change of focus, means for effecting exposure of said sensitized photographic element through said lens system, and means operable during said exposure for effecting movement of said movable lens.

27. A photographic camera for impressing upon a sensitized photographic element a plurality of images of an object or scene, each image corresponding to a different plane of sharpness and each image being of substantially the same size, comprising, in combination, means for holding a sensitized camera element, a lens system through which said sensitized camera element is exposed to said scene or object, said lens system comprising a plurality of lens means, coaxially arranged, at least one of said lens means being movable throughout a certain range to progressively change the focal length of the lens system and to thereby impress upon said photographic element a plurality of images of said scene or object corresponding respectively to different planes of sharpness ranging from a plane relatively near the camera to a plane relatively remote from the camera, said lens system having fixed principal planes throughout the range of movement of said movable lens means, whereby said impressed images of said object or scene are in substantial registry on said photographic element, a shutter for exposing said sensitized element through said lens system to said scene or object, means guiding said movable lens means for movement axially within said certain range, and means operating during the interval of time that said sensitized element is exposed by said shutter for moving said movable lens means along said guiding mans.

28. In photographic apparatus, in combination, a lens system adapted to form images of objects or a scene, means for intermittently moving a strip of film through a position to be affected by said images, said means including a rotating element, means adapted to control the passage of light rays through said lens system and to said film to expose successive portions of said strip to said images each for an interval of time, said lens system comprising a plurality of lenses coaxially arranged, one of said lenses being movable axially, means mounting said movable lens for movement along the optical axis of said lens system within a certain range, said guiding means comprising two telescopically arranged members, one of which members is relatively fixed and the other of which members is movable relative thereto and carries said movable lens, and means comprising cam means driven by said rotating element for imparting to said movable telescopic member and hence to said movable lens a movement during the time interval of exposure of a portion of said strip of film.

29. In photographic apparatus, in combination, a lens system adapted to form images of objects or a scene, means for intermittently moving a strip of film through a position to be affected by said images, said means including a rotating element, means adapted to control the passage of light rays through said lens system and to said film to expose successive portions of said strip to said images each for an interval of time, said lens system comprising a plurality of lenses coaxially arranged, one of said lenses being movable axially, means mounting said movable lens for movement along the optical axis of said lens system within a certain range, said means comprising a relatively stationary sleeve-like means carrying certain of said lenses and supporting means having mounted therein said movable lens and extending into said stationary sleeve-like means, guiding means for said supporting means to guide the latter and the lens carried thereby along the optical axis of said lens system, and means driven from said rotating element for moving said supporting means and hence the lens carried thereby during the interval of time that a portion of said strip is exposed.

30. In photographic apparatus, in combination, a lens system adapted to form images of objects or a scene, means for intermittently moving a strip of film through a position to be affected by said images, said means including a rotating element, means adapted to control the passage of light rays through said lens system and to said film to expose successive portions of said strip to said images each for an interval of time, said lens system comprising coaxially arranged stationary lens means and movable lens means, sleeve-like means fixedly mounted and having said stationary lens means mounted therein so as substantially to close said sleeve-like means at its two ends, a sleeve-like member slidably mounted within said sleeve-like means and carrying said movable lens means for thereby making the latter movable relative to said stationary lens means, and driving connections between said rotating element and said sleeve-like member for moving the latter and hence the lens means carried thereby during the interval of time that a portion of said strip is exposed.

31. In photographic apparatus, in combination, a lens system adapted to form images of objects or a scene, means for intermittently moving a strip of film through a position to be affected by said images, said means including a rotating element, means adapted to control the passage of light rays through said lens system and to said film to expose successive portions of said strip to said images each for an interval of time, said lens system comprising coaxially arranged stationary lens means and movable lens means, sleeve-like means fixedly mounted and having said stationary lens means mounted therein so as substantially to close said sleeve-like means at its two ends, a sleeve-like member slidably mounted within said sleeve-like means and carrying said movable lens means for thereby making the latter movable relative to said stationary lens means, said sleeve-like means having aperture means in a wall thereof interiorly closed off by said slidable sleeve-like member, and driving connections between said rotating element, including means engaging said sleeve-like member through said aperture means, for moving said sleeve-like member and hence the lens carried thereby during the interval of time that a portion of said strip is exposed.

32. In photographic apparatus, in combination, a lens system adapted to form images of objects or a scene, means for intermittently moving a strip of film through a position to be affected by said images, said means including a rotating element, means adapted to control the passage of light rays through said lens system and to said film to expose successive portions of said strip to said images each for an interval of time, said lens system comprising coaxially arranged stationary lens means and movable lens means, sleeve-like means fixedly mounted and having said stationary lens means mounted therein so as substantially to close said sleeve-like means at its two ends, a sleeve-like member slidably mounted within said sleeve-like means and carrying said movable lens means for thereby making the latter movable relative to said stationary lens means, said sleeve-like means having two substantially opposed apertures interiorly closed off by said sleeve-like member and the latter having trunnion-like members respectively exposed through said apertures, actuating means exterior of said sleeve-like means and having two opposed parts respectively engaging said trunnion-like members, means movably supporting said actuating means, and driving connections between said rotating element and said actuating means for moving the latter and hence said movable lens means in timed relation to said second-mentioned means.

33. In photographic apparatus, in combination, a lens system adapted to form images of objects or a scene, means for intermittently moving a strip of film through a position to be affected by said images, said means including a rotating element, means adapted to control the passage of light rays through said lens system and to said film to expose successive portions of said strip to said images each for an interval of time, said lens system comprising coaxially arranged stationary lens means and movable lens means, sleeve-like means fixedly mounted and having said stationary lens means mounted therein so as substantially to close said sleeve-like means at its two ends, a sleeve-like member slidably mounted within said sleeve-like means and carrying said movable lens means for thereby making the latter movable relative to said stationary lens means, said sleeve-like means having two substantially opposed apertures interiorly closed off by said sleeve-like member and the latter having trunnion-like members respectively exposed through said apertures, a pivotally mounted lever having two arms respectively engaging said trunnion-like members, and driving connections between said rotating element and said lever for oscillating the latter and hence said movable lens means in timed relation to said first-mentioned means.

34. In photographic apparatus, in combination, a lens system adapted to form images of objects or a scene, means for intermittently moving a strip of film through a position to be affected by said images, said means including a rotating element, means adapted to control the passage of light rays through said lens system and to said film to expose successive portions of said strip to said images each for an interval of time, said lens system comprising a plurality of lens means, means relatively fixedly mounting certain of said lens means to hold the latter in axial alinement, a movable supporting means holding other of said lens means of said lens system and coaxially therewith, means providing a guideway that extends parallel to the coincident axes of said stationary lens means for guiding said supporting means and for thereby causing said movable lens means supported thereby to move coaxially with and along the coincident axes of said first-mentioned lens means, and means including cam means driven by said rotating element for moving said supporting means in timed relation to said second-mentioned means.

LUDWIG M. DIETERICH.